United States Patent
Pulsipher

(10) Patent No.: US 8,108,878 B1
(45) Date of Patent: Jan. 31, 2012

(54) METHOD AND APPARATUS FOR DETECTING INDETERMINATE DEPENDENCIES IN A DISTRIBUTED COMPUTING ENVIRONMENT

(75) Inventor: Darren W. Pulsipher, Alpine, UT (US)

(73) Assignee: Cadence Design Systems, Inc., San Jose, CA (US)

(*) Notice: Subject to any disclaimer, the term of this patent is extended or adjusted under 35 U.S.C. 154(b) by 1363 days.

(21) Appl. No.: 11/297,604

(22) Filed: Dec. 8, 2005

Related U.S. Application Data

(60) Provisional application No. 60/634,717, filed on Dec. 8, 2004, provisional application No. 60/634,481, filed on Dec. 8, 2004.

(51) Int. Cl.
*G06F 9/46* (2006.01)

(52) U.S. Cl. ........................ 718/106; 718/100

(58) Field of Classification Search .................. 718/106, 718/100, 102, 104
See application file for complete search history.

(56) References Cited

U.S. PATENT DOCUMENTS

| | | | |
|---|---|---|---|
| 4,825,354 A | 4/1989 | Agrawal et al. | |
| 5,319,758 A | 6/1994 | Arai et al. | |
| 5,381,534 A * | 1/1995 | Shi | 709/203 |
| 5,459,871 A * | 10/1995 | Van Den Berg | 718/104 |
| 5,802,291 A | 9/1998 | Balick et al. | |
| 5,832,484 A * | 11/1998 | Sankaran et al. | 1/1 |
| 5,903,891 A | 5/1999 | Chen et al. | |
| 6,009,266 A | 12/1999 | Brownell et al. | |
| 6,182,154 B1 | 1/2001 | Campagnoni et al. | |
| 6,182,158 B1 | 1/2001 | Kougiouris et al. | |
| 6,223,200 B1 * | 4/2001 | Barnes et al. | 718/100 |
| 6,226,618 B1 * | 5/2001 | Downs et al. | 705/51 |
| 6,247,041 B1 | 6/2001 | Krueger et al. | |
| 6,269,373 B1 | 7/2001 | Apte et al. | |
| 6,321,264 B1 | 11/2001 | Fletcher et al. | |
| 6,378,066 B1 * | 4/2002 | Lewis | 712/236 |
| 6,418,484 B1 | 7/2002 | Radia | |
| 6,438,616 B1 | 8/2002 | Callsen et al. | |
| 6,505,210 B1 | 1/2003 | Frey et al. | |
| 6,594,671 B1 | 7/2003 | Arman et al. | |
| 6,651,047 B1 | 11/2003 | Weschler, Jr. | |
| 6,678,714 B1 * | 1/2004 | Olapurath et al. | 718/104 |
| 6,681,242 B1 * | 1/2004 | Kumar et al. | 718/104 |
| 6,704,806 B1 | 3/2004 | Decker | |
| 6,772,216 B1 | 8/2004 | Ankireddipally et al. | |
| 6,792,606 B2 | 9/2004 | Halter et al. | |
| 6,961,716 B2 | 11/2005 | Rhodes | |
| 6,993,771 B1 | 1/2006 | Hasha et al. | |

(Continued)

OTHER PUBLICATIONS

L. Ferriera, et al., "Introduction to Grid Computing With Globus", *IBM Redbooks*, Sep. 2003.

(Continued)

*Primary Examiner* — Van Nguyen
(74) *Attorney, Agent, or Firm* — Vista IP Law Group, LLP

(57) ABSTRACT

Method and system for detecting indeterminate dependencies in a distributed computing grid. A determination is made whether a deadlock situation exists within a workflow of the distributed computing grid and a user of the computing grid is notified of the deadlock situation, e.g., where in the workflow deadlock occurs. A deadlock situation can be determined based on direct and indirect dependencies, such as loops and dependencies involving a first work element and a lower level second work element. A deadlock situation can also be determined based on the relationships between a job and a task, which is executable by a processor in the distributed computing grid.

55 Claims, 23 Drawing Sheets

U.S. PATENT DOCUMENTS

| | | | |
|---|---|---|---|
| 7,043,731 | B2 | 5/2006 | Ramaswamy |
| 7,051,098 | B2 | 5/2006 | Masters et al. |
| 7,184,967 | B1 * | 2/2007 | Mital et al. ............... 705/8 |
| 7,379,994 | B2 | 5/2008 | Collazo |
| 7,506,046 | B2 | 3/2009 | Rhodes |
| 7,571,181 | B2 | 8/2009 | Rhodes |
| 7,584,474 | B2 | 9/2009 | Gondi et al. |
| 2002/0099821 | A1 | 7/2002 | Hellerstein et al. |
| 2002/0116205 | A1 | 8/2002 | Ankireddipally et al. |
| 2003/0037136 | A1 | 2/2003 | Labovitz et al. |
| 2003/0088708 | A1 | 5/2003 | Lewallen |
| 2003/0100957 | A1 * | 5/2003 | Chaffee et al. ............ 700/18 |
| 2003/0120701 | A1 * | 6/2003 | Pulsipher et al. ......... 709/102 |
| 2003/0120708 | A1 | 6/2003 | Pulsipher et al. |
| 2003/0120709 | A1 | 6/2003 | Pulsipher et al. |
| 2003/0120710 | A1 | 6/2003 | Pulsipher et al. |
| 2003/0120764 | A1 | 6/2003 | Laye et al. |
| 2004/0019898 | A1 | 1/2004 | Frey et al. |
| 2004/0025163 | A1 * | 2/2004 | Babutzka et al. ......... 718/106 |
| 2004/0078105 | A1 | 4/2004 | Moon et al. |
| 2005/0188088 | A1 | 8/2005 | Fellenstein et al. |
| 2005/0198247 | A1 | 9/2005 | Perry et al. |
| 2005/0240668 | A1 | 10/2005 | Rolia et al. |
| 2005/0283786 | A1 | 12/2005 | Dettinger et al. |
| 2006/0048157 | A1 | 3/2006 | Dawson et al. |

OTHER PUBLICATIONS

Non Final Office Action dated Apr. 2, 2008 for U.S. Appl. No. 11/297,621.
Final Office Action dated Oct. 21, 2008 for U.S. Appl. No. 11/297,621.
Non Final Office Action dated Mar. 16, 2009 for U.S. Appl. No. 11/297,621.
Final Office Action dated Jul. 21, 2009 for U.S. Appl. No. 11/297,621.
Non-Final Office Action dated Nov. 12, 2009 for U.S. Appl. No. 11/297,621.
Non-Final Office Action dated Mar. 31, 2010 for U.S. Appl. No. 11/297,268.
Final Office Action dated Apr. 12, 2010 for U.S. Appl. No. 11/297,621.
Non-Final Office Action dated Mar. 24, 2010 for U.S. Appl. No. 11/297,562.
Non-Final Office Action dated Mar. 4, 2010 for U.S. Appl. No. 11/297,609.
Non-Final Office Action dated Nov. 16, 2010 for U.S. Appl. No. 11/297,609.
Final Office Action dated Nov. 23, 2010 for U.S. Appl. No. 11/297,621.
Final Office Action dated Aug. 13, 2010 for U.S. Appl. No. 11/297,609.
Final Office Action dated Oct. 20, 2010 for U.S. Appl. No. 11/297,268.
Final Office Action dated Aug. 16, 2010 for U.S. Appl. No. 11/297,562.
Non-Final Office Action dated Aug. 3, 2010 for U.S. Appl. No. 11/297,621.
Notice of Allowance dated Mar. 4, 2011 for U.S. Appl. No. 11/297,609.

* cited by examiner

Work Inheritance

| Status Icon | ☒ |
|---|---|
| 1 | Created |
| ⧖ | Pending |
| ⊟ | Blocked |
| ‖ | Suspended |
| 🏃 | Active |
| ⊘ | Cancelled |
| ✓ | Completed |
| ◇ | Warning |
| ✕ | Error |
| ☠ | Killed |

Work States

Fig. 4C

Work States

TASK STATES

| Name | | Time | |
|---|---|---|---|
| 1 | BuildCycle(B01) | | Finishes when all sub-work is finished |
| 1.1 | Build3rdParty(B01) | | Note: Finishes after 1.1.1 and 1.1.2 |
| 1.1.1 | Build3rdPartyTool(B01, "1") | | Finishes after 1.1.1.1 |
| 1.1.1.1 | make tool1 | | |
| 1.1.2 | Build3rdPartyTool(B01, "2") | | Finishes after 1.1.2.1 |
| 1.1.2.1 | make tool2 | | |
| 1.2 | preBuild.pl B01 | Start after 1.1 | |
| 1.3 | BuildComponent(B01, "1") | Start after 1.2 | Finish after 1.3.3 |
| 1.3.1 | premake.pl component 1 | | |
| 1.3.2 | make component 1 | Start after 1.3.1 | |
| 1.3.3 | postmake.pl component 1 | Start after 1.3.2 | |
| 1.4 | BuildComponent(B01, "2") | Start after 1.2 | Finish after 1.4.3 |
| 1.4.1 | premake.pl component 2 | | |
| 1.4.2 | make component 2 | Start after 1.4.1 | |
| 1.4.3 | postmake.pl component 2 | Start after 1.4.2 | |
| 1.5 | BuildComponent(B01, "3") | Start after 1.2 | Finish after 1.5.3 |
| 1.5.1 | premake.pl component 3 | | |
| 1.5.2 | make component 3 | Start after 1.5.1 | |
| 1.5.3 | postmake.pl component 3 | Start after 1.5.2 | |
| 1.6 | postMake.pl B01 | Start after 1.3, 1.4, and 1.5 | |

TASK TIMING

Fig. 4F

Job States

Table 2-1 Timing Chart

Legend (column markers across Time): Created, Pending, Blocked, Active, Completed

| Name | | Time |
|---|---|---|
| 1 | BuildCycle(B01) | |
| 1.1 | GatherCode(B01) | Finishes after 1.1.1 and 1.1.2 |
| 1.1.1 | MergeCode (B01) | |
| 1.1.2 | Get3rdParty (B01) | |
| 1.2 | BuildComponent (B01, "1") | Start after 1.1 — Finishes after 1.2 * |
| 1.2.1 | BuildProduct (B01) | Start w/Parent |
| 1.2.2 | BuildComponent (B01, "1") | Start w/Parent |
| 1.2.3 | BuildComponent (B01, "2") | Start w/Parent |
| 1.2.4 | BuildComponent (B01, "3") | Start w/Parent |
| 1.3 | TestProduct (B01) | Starts when 1.2 is finished — Finishes after 1.3 |
| 1.3.1 | TestComponents (B01) | Start with 1.3 |
| 1.3.1.1 | TestComponent (B01, "1") | Start with 1.3.1 — Finishes after 1.3.1 * |
| 1.3.1.2 | TestComponent (B01, "2") | Start with 1.3.1 |
| 1.3.1.3 | TestComponent (B01, "3") | Start with 1.3.1 |
| 1.3.2 | TestSystemIntegration (B01) | Start with 1.3.1 |
| 1.3.3 | TestSystemFlow (B01) | Start with 1.3.1 |
| 1.4 | PackageProduct (B01) | Start after 1.3 |
| 1.4.1 | Gather3rdParty (B01) | |
| 1.4.2 | GatherBinaries (B01) | |
| 1.4.3 | CreateInstallation (B01) | |
| 1.4.4 | CreatePackage (B01) | |

JOB TIMING

Fig. 4H

METHOD AND APPARATUS FOR DETECTING INDETERMINATE DEPENDENCIES IN A DISTRIBUTED COMPUTING ENVIRONMENT

CROSS REFERENCE TO RELATED APPLICATIONS

This application claims priority under 35 U.S.C. §119 of U.S. Provisional Application No. 60/634,717, filed Dec. 8, 2004, entitled "Method and Apparatus for Detecting Indeterminate Dependencies," Docket No. CA7044441001, the contents of which are incorporated herein by reference.

This application claims priority 35 U.S.C. §119 of U.S. Provisional Application No. 60/634,481, filed Dec. 8, 2004, entitled "Method and Apparatus for Operation of Distributed Computing Systems," Docket No. CA7044461001, the contents of which are incorporated herein by reference.

This application is related to co-pending U.S. application Ser. Nos. 10/247,970, 10/251,230, 10/251,019, and 10/251,747, filed on Sep. 19, 2002, and U.S. Provisional Application Ser. No. 60/342,630, filed on Dec. 20, 2001, the contents of which are incorporated herein by reference.

FIELD OF THE INVENTION

The present invention relates generally to distributed computing system and, more particularly, to detecting indeterminate dependencies or deadlock within a distributed computing system.

BACKGROUND

Distributed or grid computing provides the ability to share and allocate processing requests and resources among various nodes, computers or server farm(s) within a grid. A server farm is generally a group of networked servers or, alternatively, a networked multi-processor computing environment, in which work is distributed between multiple processors. Workload is distributed between individual components or processors of servers. Networked servers of a grid can be geographically dispersed. Grid computing can be confined to a network of computer workstations within a company or it can be a public collaboration.

Resources that are distributed throughout the grid include various objects. An object is a self-contained module of data and associated processing that resides in a process space. There can be one object per process or tens of thousands of objects per process.

A server farm environment can include different classes of resources, machine types and architectures, operating systems, storage and hardware. Server farms are typically coupled with a layer of load-balancing or distributed resource management (DRM) software to perform numerous tasks, such as managing and tracking processing demand, selecting machines on which to run a given task or process, and scheduling tasks for execution.

In any computing or processing systems, however, resource conflicts may occur for usage patterns that create a "deadlock" situation. Referring to FIG. 9, a classic deadlock situation 900 exists when a first processing entity 910 is waiting for a first resource 920 that is presently locked by a second processing entity 912. The second entity 912 cannot release the first resource 920 until the second entity 912 has completed its processing. The second entity 912 cannot complete its because the second entity 912 itself is waiting for a second resource 922 to be freed before the second entity 912 can continue its processing. The second resource 922 is locked by the first processing entity 910, which cannot release the second resource 922 until the first processing entity 910 has processed the first resource 920. As a result, a deadlock 900 exists since neither processing entity can proceed because the resource needed for processing by each processing entity is held by the other processing entity.

Deadlocks can become much more complex in a real-world workflow processing when there can be a large number of processing entities (e.g., processes, threads, users, nodes, etc.) involved in a deadlock situation. With a workflow, when a job request is issued, (e.g., using a Job Request Language (JRL), the job request may include dependencies, aggregation, conditional dependencies, and retries, which can cause or complicate deadlock situations, which can cause unacceptable levels of delays and processing inefficiencies.

In a normal processing system, it can be difficult to identify and address deadlocks. Identification of deadlocks can become even more difficult when deadlocks occur in a distributed computing networks, such as grid-based processing systems, that may include multiple processing entities in different grids in a job-controlled networked environment.

Accordingly, there exists a need for a method and system for detecting and addressing deadlocks in a grid-based computing system. Embodiments fulfill these needs.

SUMMARY

According to one embodiment, a method for detecting indeterminate dependencies in a distributed computing grid includes determining whether a deadlock situation exists within a workflow of the distributed computing grid and notifying the user of the deadlock situation if the deadlock exists.

Another embodiment is directed to a method for detecting indeterminate dependencies in a distributed computing grid that includes determining whether a deadlock situation exists within a workflow of the distributed computing grid and if a deadlock situation exists, notifying the user of a location in the workflow where the deadlock situation exists. Determining whether deadlock exists is performed by determining whether execution of a first child element depends directly on execution of a second child element, determining whether a dependency loop exists, wherein the loop begins and terminates at the same child element of the workflow and determining whether a chain of dependencies begins at a first child work element of the workflow and ends at a lower level child element of the workflow.

In a further alternative embodiment, deadlock determination is performed by determining whether execution of a first child element depends directly on execution of a second child element, and determining whether a dependency loop exists. A loop begins and terminates at the same child workflow element. The method determining whether deadlock exists further includes determining whether a chain of dependencies begins at a first child work element of the workflow and ends at a lower level child element of the workflow. A determination is also made whether a child element of the workflow is associated with a retry definition and whether a task conflict exists for task child elements. A task conflict can be a job that follows a task.

In various embodiments, deadlock determination can be performed by beginning at a top of a workflow and propagating down the workflow to determine whether a child element, such as a job or task, can cause a deadlock situation. For example, a parent job in a workflow can be identified. A child workflow element is identified and a determination is made whether the child element can cause a deadlock situation by, for example, identifying direct or indirect dependencies. A deadlock situation can also be created as a result of a task conflict, such as when a job that follows a task in the workflow.

Further, in various embodiments, if a deadlock situation exists, a message concerning the deadlock can be generated and propagated up the workflow hierarchy from a child element to the top of the workflow. A user can also be sent the message to be notified of the deadlock.

BRIEF DESCRIPTION OF THE DRAWINGS

Referring now to the drawings, in which like reference numbers represent corresponding parts throughout, and in which:

FIG. 4C illustrates states of work;

FIG. 4F illustrates timing of tasks;

FIG. 4H illustrates timing of jobs;

DETAILED DESCRIPTION OF ILLUSTRATED EMBODIMENTS

Embodiments of the invention enhance distributed grid computing systems or environments by providing a method and system for determining whether a deadlock situation exists. If not, processing continues. The deadlock analysis can go down a workflow tree and determine dependencies, determine whether any dependency recursions or loops exist, and If a deadlock is identified, then a notification is made, e.g. to the user, that tells the user where the deadlock has occurred. The deadlock can be automatically addressed, e.g., by stopping a job or processing entity, or by releasing a resource that is needed for processing.

Embodiments of the invention can be executed in a single computer (e.g., a client computer) or in multiple computers, e.g., between a client and one or more servers across a network connection and in various distributed computing environments. FIGS. 1-41 illustrate one exemplary computing environment or "grid" in which system and method embodiments for gathering, modeling and presenting resource data can be implemented. A "grid" is generally known as a collection of nodes, resources or hosts, each of which contributes one or more resources to the grid. The following description of an exemplary grid is provided for purposes of explanation and illustration. Persons skilled in the art will appreciate that embodiments can be used in other distributed computing environments.

Figure 1:
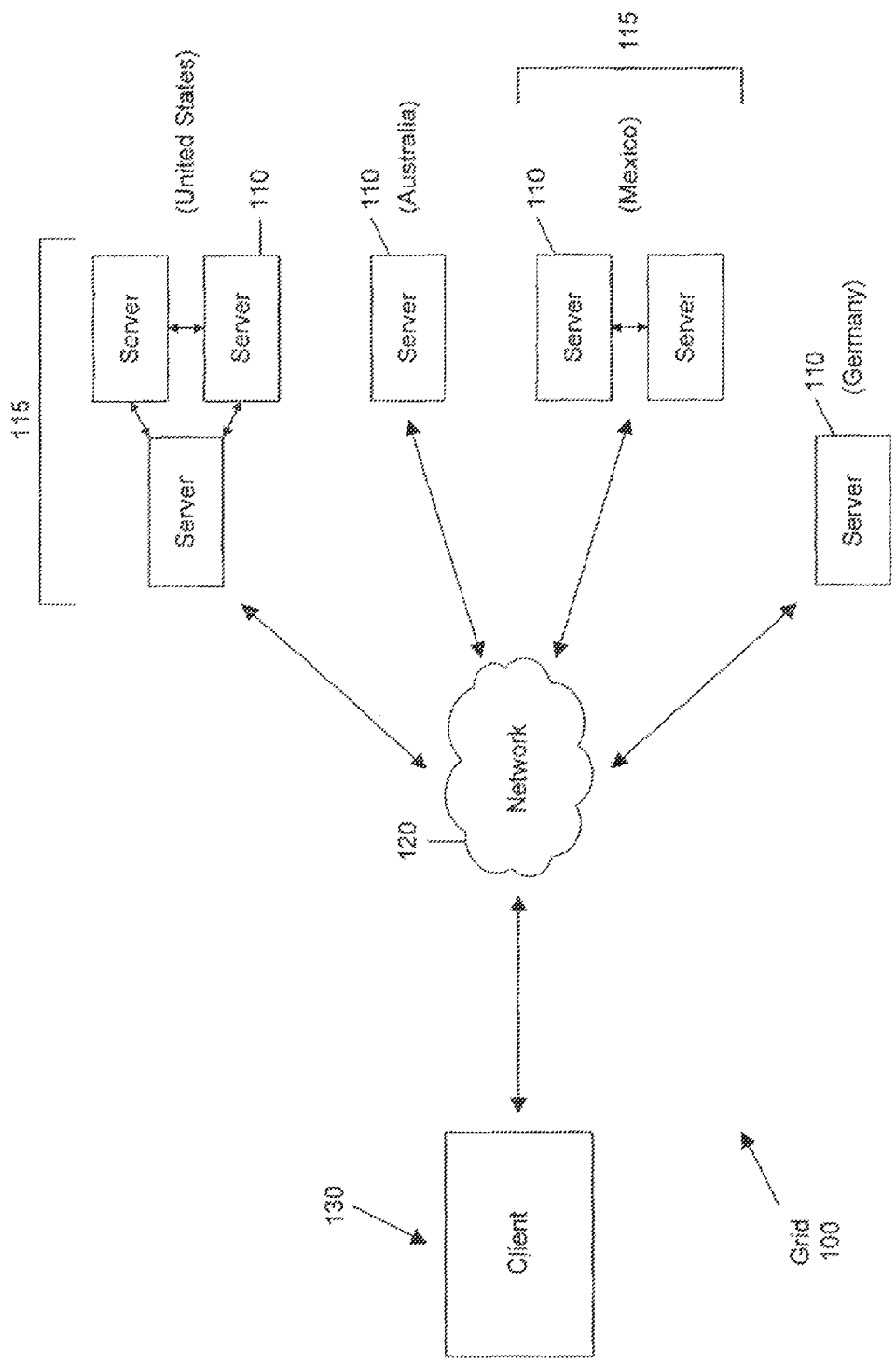
FIG. 1 is a block diagram generally illustrating a grid computing environment in which embodiments can be implemented.
Figure 2:
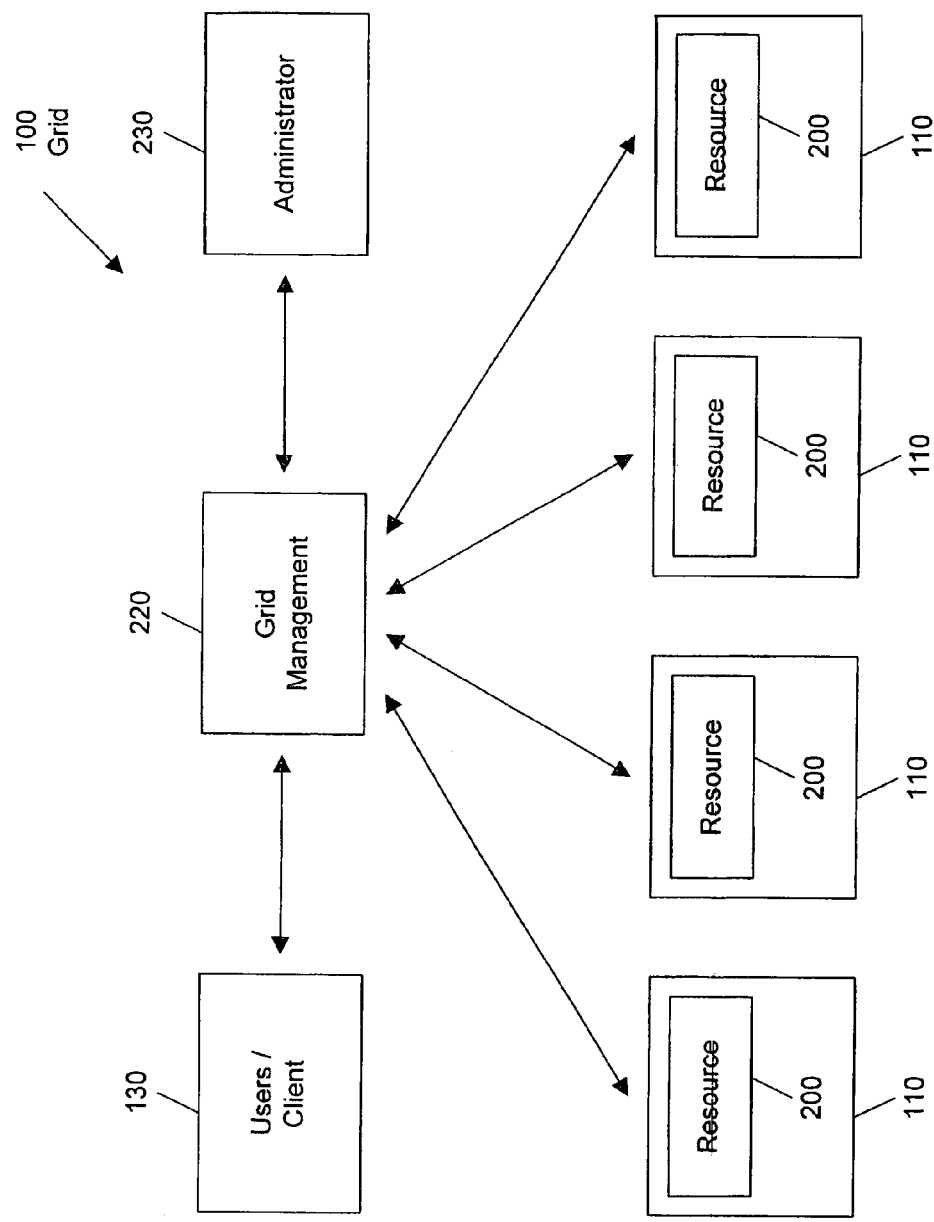
FIG. 2 is a block diagram further illustrating grid management and resources in a grid computing environment.

FIGS. 1 and 2 generally illustrate one exemplary computing grid 100 that includes various numbers of servers 110 or groups of servers or server farms or clusters 115, which are connected via a communication link 120. The communication link 120 can be a network connection, such as a Local Area Network (LAN), a Wide Area Network (WAN), and a Public Switched Telephone Network (PSTN). One computer 130 is identified as the client or the requesting entity, which issues a request for a resource from one or more of the servers 110. The request can be made by, for example, a client process or an object This specification generally refers to a client requesting entity for purposes of explanation, not limitation.

One or more servers 110 in one location can be connected to one or multiple or all of the other servers 110 of the grid via network 120. A server farm 115 or group of servers can be one node or component in a grid 100. Thus, a grid 100 can include different numbers of nodes or server farms 115. The grid 100 can also be distributed across different geographic domains, such as across offices (e.g., offices in the same or different location), different cities, states, countries and continents. Thus the grid may be local and/or external. For purposes of illustration, not limitation, FIG. 1 illustrates a grid 100 that is distributed across different continents. The client or requesting entity 130 is considered to be local or internal and the other servers 110 connected to the network 120 are external relative to the client 130.

The grid 100 can be used to, for example, run an application on multiple servers, allocate computing resources among grid components, provide parallel processing and provide enhanced data storage and processing capabilities. The grid 100 can also be used to allocate and share equipment, software and licenses. For example, if resource on a server 110 is overloaded, a job request can be directed to another server in the grid that has that resource so that the request can be processed. This specification generally refers to a grid in the context of distributed computing and resource allocation, however, grid environments can also be used with other applications, such as communications involving cell phones and personal digital assistants (PDAs).

Referring to FIG. 2, a grid 100 is generally an interconnected set of nodes or servers 110, which host one or more resources 200. The same resource 200 can reside on one or more or all of the servers 110. The resources 200 and organization and control thereof can be managed 220 and controlled by an administrator 230.

Figure 3:
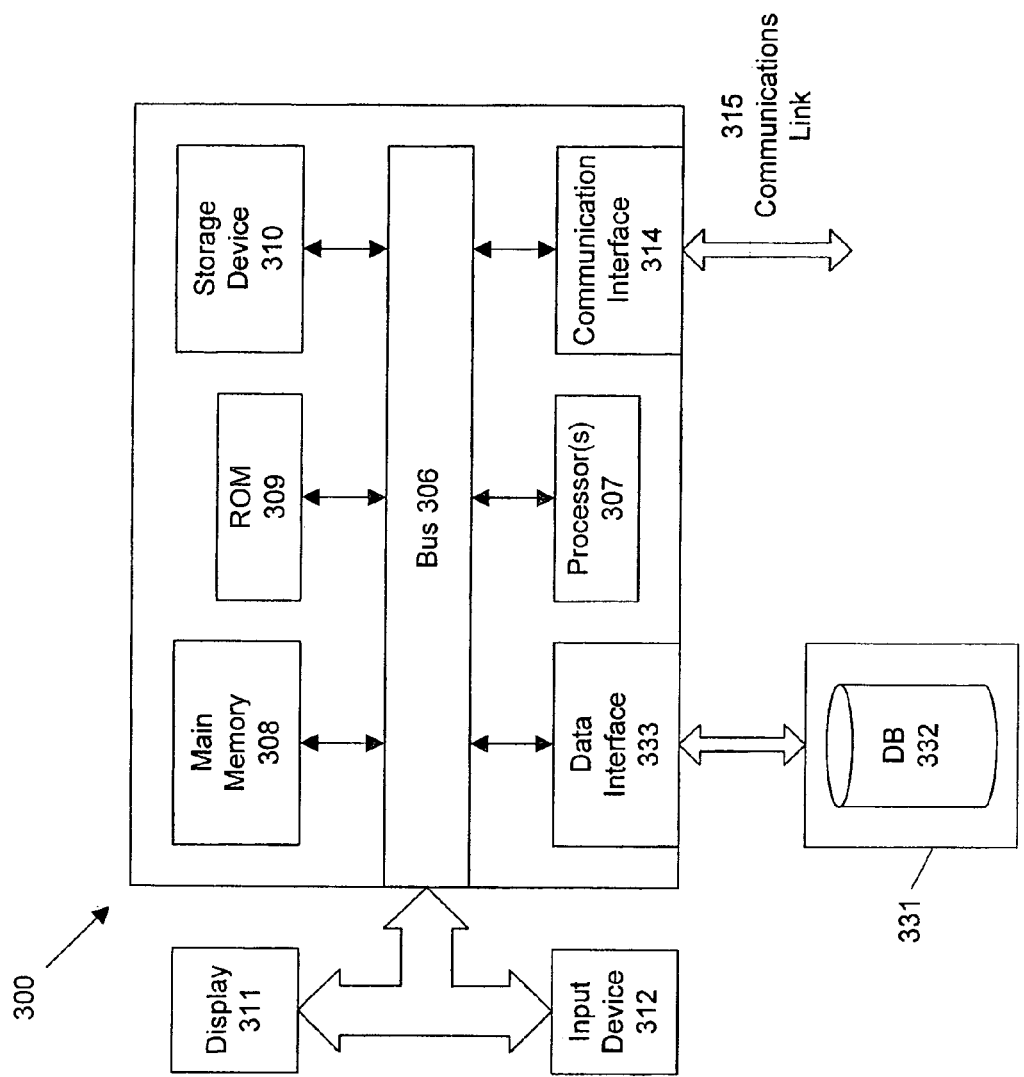
FIG. 3 is a block diagram of an exemplary server of a computing grid.

One exemplary computer system or server 110 that can be used in the grid 100 is shown in FIG. 3. The terms server, computer and computer system are broadly used to describe any computing device that can store and run one or more programs to implement method and system embodiments. Sequences of instructions of embodiments can be performed by a single computer system or server 110 or two or more computer systems or servers 110 coupled by a communication link 315, which serves as an interface to a communications network 120.

Each computer system 300 may include a communication interface 314 coupled to a bus 306. The interface 314 provides two-way communication between computer systems 300 through communication link 315 and network 120. The communication interface 314 transmits and receives electrical, electromagnetic or optical signals that include data streams representing various types of signal information, e.g., instructions, messages and data. The communication link 315 connects one computer system 300 with another computer system 300. For example, the communication link 315 may be a LAN, in which case the communication interface 314 may be a LAN card, or the communication link 315 may be a PSTN, in which case the communication interface 314 may be an integrated services digital network (ISDN) card or a modem, or the communication link 315 may be the Internet, in which case the communication interface 314 may be a dial-up, cable or wireless modem. Other communication interfaces and links can be utilized as needed. The computer system 300 may transmit and receive messages, data, and instructions, including program, such as an application or code, through its respective communication link 315 and communication interface 314. The received program code may be executed by the respective processor(s) 307 as it is received, and/or stored in the storage device 310, or other associated non-volatile media, for later execution.

The computer system 300 can operate in conjunction with a data storage system 331, e.g., a data storage system that contains a database 332 that is accessible by the computer system 300. The computer system 300 communicates with the data storage system 331 through a data interface 333 coupled to the bus 306. The system 300 transmits and receives electrical, electromagnetic or optical signals, that include data streams representing various types of signal information, e.g., instructions, messages and data. In embodiments, the functions of the data interface 333 may be performed by the communication interface 314.

The system 300 includes a bus 306 or other mechanism for communicating instructions, messages and data, collectively, information, and one or more processors 307 coupled with the bus 306 for processing information. The system 300 also includes a main memory 308, such as a random access memory (RAM) or other dynamic storage device, coupled to the bus 306 for storing dynamic data and instructions to be executed by the processor(s) 307. The main memory 308 also may be used for storing temporary data, such as variables and other intermediate information during execution of instructions by the processor(s) 307.

The system 300 may further include a read only memory (ROM) 309 or other static storage device coupled to the bus 306 for storing static data and instructions for the processor(s) 307. A storage device 310, such as a magnetic disk or optical disk, may also be provided and coupled to the bus 306 for storing data and instructions for the processor(s) 307. The computer system 300 may be coupled via the bus 306 to a display device 311, such as, a cathode ray tube (CRT), for displaying information to a user. An input device 312, e.g., alphanumeric and other keys, is coupled to the bus 306 for communicating information and command selections to the processor(s) 307.

An individual computer system 300 performs specific operations by their respective processor(s) 307 executing one or more sequences of one or more instructions contained in the main memory 308. Such instructions may be read into the main memory 308 from another computer-usable medium, such as the ROM 309 or the storage device 310. Execution of the sequences of instructions contained in the main memory 308 causes the processor(s) 307 to perform the processes described herein. Hard-wired circuitry may be used in place of or in combination with software instructions. Persons skilled in the art will appreciate that OL system and method embodiments can be implemented using other computer systems and hardware and/or software.

Further, embodiments may be stored on various types of computer-usable medium, which is any medium that provides information or is usable by the processor(s) 307. Exemplary media include non-volatile and volatile media. Non-volatile media, i.e., media that can retain information in the absence of power, includes the ROM 509, CD ROM, magnetic tape, and magnetic discs. Volatile media, i.e., media that can not retain information in the absence of power, includes the main memory 308.

Figure 4A:
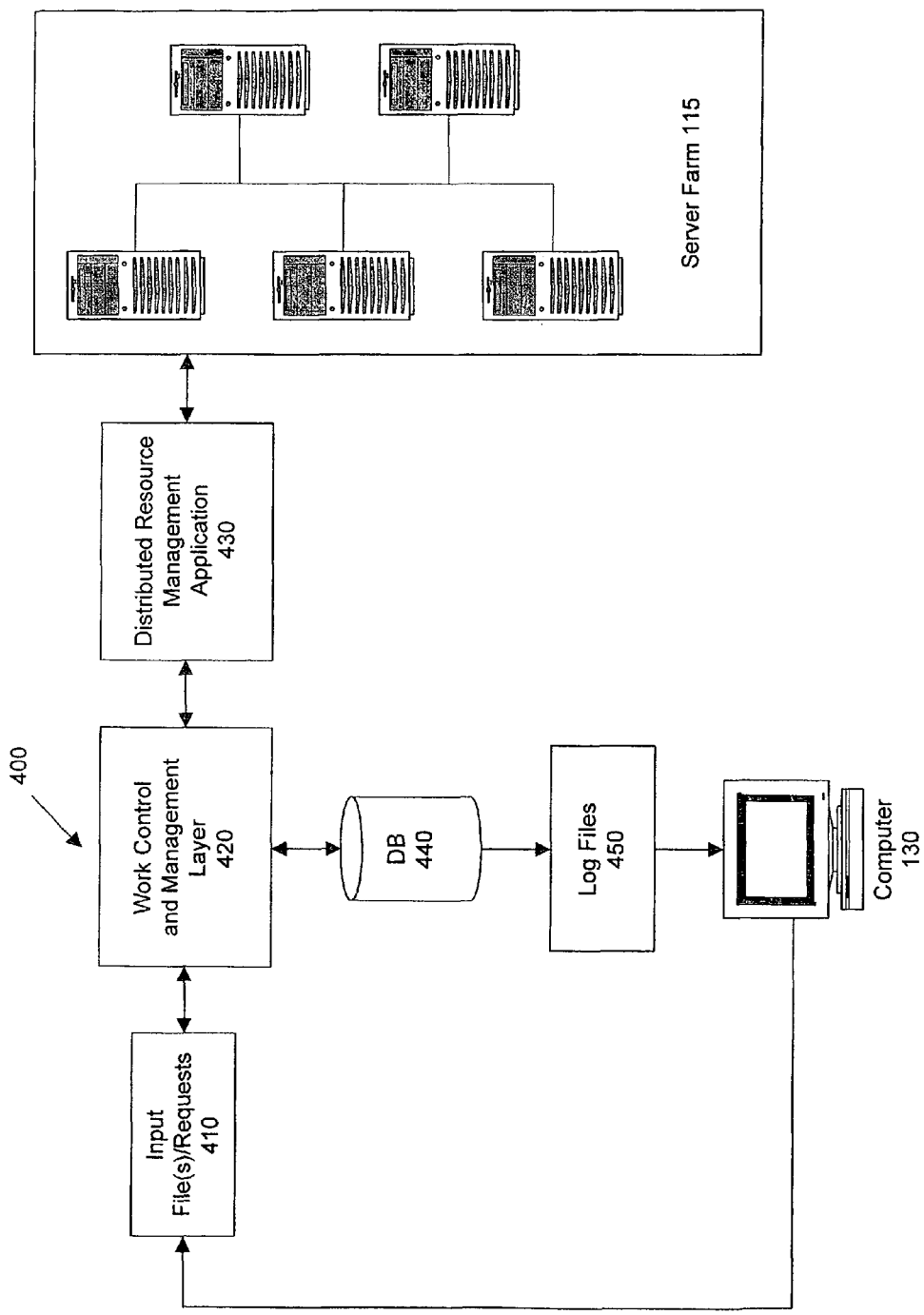
FIG. 4A is a block diagram generally illustrating a grid computing environment having a work control and resource management elements.

Referring to FIG. 4A, according to one embodiment, control and management 220 of the grid 100 and requests issued over the grid 100 is performed using gridMatrix 400, developed by Cadence Design Systems, Inc., 2655 Seely Avenue San Jose, Calif. 95134. The gridMatrix 400 is middleware or software that provides users and administrators control over jobs in the grid. More specifically, the gridMatrix 400 is a job definition, control monitoring and reporting software program.

The exemplary system or environment includes a workstation or client computer 130, from which a user can create and submit one or more input files 410. The input files 410 can be, for example, Job Request Language (JRL) files, that define a work request specifying one or more jobs having one or more executable task commands. Processes use JRL in conjunction with the control and management layer 420, one example of which is the gridMatrix 400, to manage execution of work in the grid 100.

The gridMatrix 400 interprets JRL files 410 and compiles them into objects, which execute on a server 110 or server farm 11 or invoke executables to be run on a server 110. Typically, the objects are passed through the DRM application 430 that schedules and manages work to be run on the processors 107 of a server 110. More specifically, the gridMatrix 400 interprets JRL work requests 410, instantiates distributed objects, invokes software servers to manage execution of commands, and interfaces with DRM 430 applications.

The commands and data correspond to the work that is defined in the input file 410. Thus, the gridMatrix 400 interprets and acts upon the input file 410 and causes the DRM application 430 to execute task commands on a server 110. The database 440 stores information related to many of the processes described herein.

For example, task commands constituent to a piece of work are essentially instantiated into computing objects, which are maintained persistently in the database 440. A persistent object is an object that continues to exist after the program that created it has been unloaded and is stored for later use. Persons skilled in the art that "persistent" in the context of an object generally refers to the duration of the object. Embodiments, therefore, are not to be limited to objects that exist for particular periods of time. Rather, persistent objects may be permanent or temporary and exist for various durations.

Objects are also made to be distributable so that they are accessible to different processes within the work execution flow. Implementation of a conventional distributed object model architecture, such as Common Object Request Broker (CORBA), can be used. CORBA or another suitable standard provides the ability to communicate between objects. A database module of the gridMatrix 400 contains base classes for all objects in the database 440.

An artifact is a piece of data that is used, generated or discarded while working with the grid. Artifacts that are used by the gridMatrix 400 include job definitions, work, tasks, jobs, and workspaces. Each of these artifacts is described in further detail below.

A job definition defines jobs and tasks that will be run when a job is submitted to the gridMatrix 400. The gridMatrix 400 allows users to add job definitions via JRL into the gridMatrix Database. The gridMatrix 400 keeps statistics on job runs, and this information can be presented in text and graphic formats to optimize job definitions for greater efficiency. JRL is the primary mechanism used to import a job definition into the gridMatrix 400. Job definitions can be added to the gridMatrix 400 and stored in a gridMatrix database. One benefit of adding a job definition is that the gridMatrix 400 can store historical information about consecutive job runs which use the same job definition. This information can be analyzed to help determine where the problems are in the process and help optimize the process for decreased execution time. After running a job against a job definition, the definition can be changed to fix problems with the process, to optimize this process, or to add more jobs to the definition.

The gridMatrix 400 can gather statistics from running jobs against the same job definition several times. Trends of execution time, duration, and pending time are given in a graph to show how the process is performing over time. Duration is the wall clock amount of time to run the job from submission to completion. Pending is the amount of time it takes the DRM 430 to dispatch the jobs to machines in the grid 100. Sequential is the cumulative amount of time it takes to run the tasks on machines in the grid 100 (i.e., if run sequentially, how long it would take).

Figure 4B:
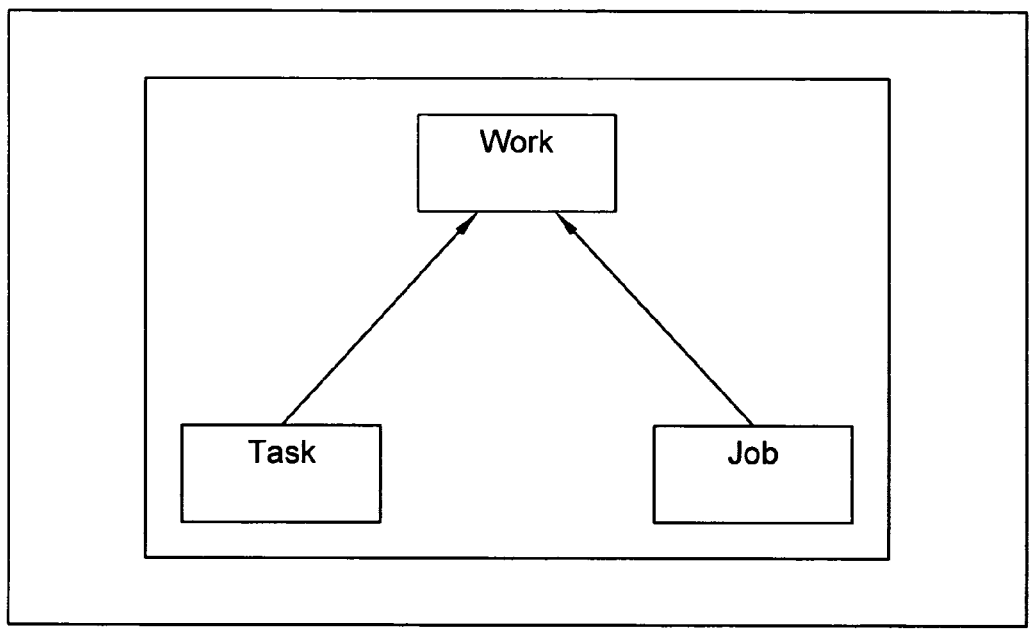
FIG. 4B illustrates jobs and tasks as different types of work.

Referring to FIG. 4B, "work" or "worfkow" represents all types of work, including jobs, topjobs and tasks. Work, and constituent jobs, can be defined with one or more JRL files. Work and workflow are generic terms for anything that the gridMatrix 400 can execute and control. Thus, "work" and "workflow" are generic terms for anything that the work control and management layer 420 can control, execute, or cause to be executed.

Work may include processes to compile or build a program, to create file directories, install applications, maintain job dependencies, etc. In other words, work includes whatever a user needs to be performed or processed.

Figure 4D:
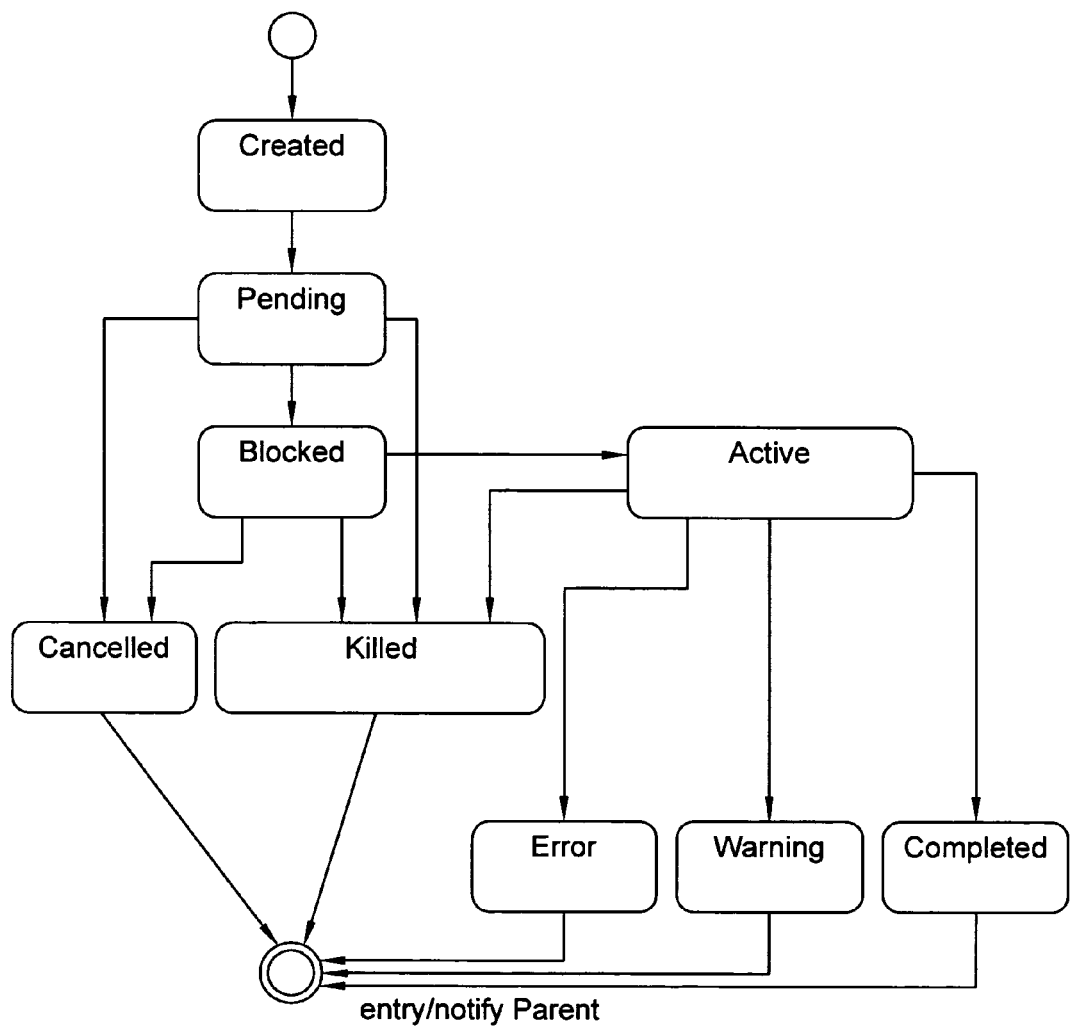
FIG. 4D further illustrates states of work.

Referring to FIGS. 4C and 4D, according to one embodiment, there are nine work states in the gridMatrix 400. Each states determines the behavior of the work and limits the next state(s) that it can transition into.

More specifically, the created state is the starting state of all work in the gridMatrix 400. Work will move from the created state to a scheduled state when scheduled for execution. The "pending" state follows the created state and denotes that work has been scheduled, but has not been sent to be executed. When work is sent for execution, it moves to the "blocked" state. In other words, after work has been pending, it moves to the blocked state, which denotes that the work has not met the criteria to be executed. When the criterion for the work has been met, the work will be moved to the active state. Tasks may be suspended until manual intervention to resume is performed. When work has met the criteria for leaving the blocked state, it moves to the active state. Work that completes its activity without warning, error or termination, transitions from the active state to the completed state. This state is also referred to as the successfully completed state. Work that is completed with some warnings, but no errors or termination, transitions from the active to warning state. The conditions for completion of work with warnings can be specific to the type of work. Work that completes with some errors, but not termination, transitions from the active to error state. The conditions for completion of work with an error can be specific to the type of work. Work properly terminated using, for example, a "matrix kill" command, after the created state, but before entering one of the finished states (completed, warning and error), moves to the killed state. The actions and conditions for a killed state can be specific to the different types of work. Work can be cancelled when criteria for execution cannot be satisfied. This can be due to a number of different factors.

A task is represented in a job definition as described by JRL, much the same as the job is represented. A task is a type of work and inherits all of the operations from work. A task represents the actual command that needs to be called in the grid 100. In other words, a task is an atomic unit of work that is performed on a server 110 and is a command that is executed on one or more processors of a networked multiprocessor computing environment.

Figure 4E:
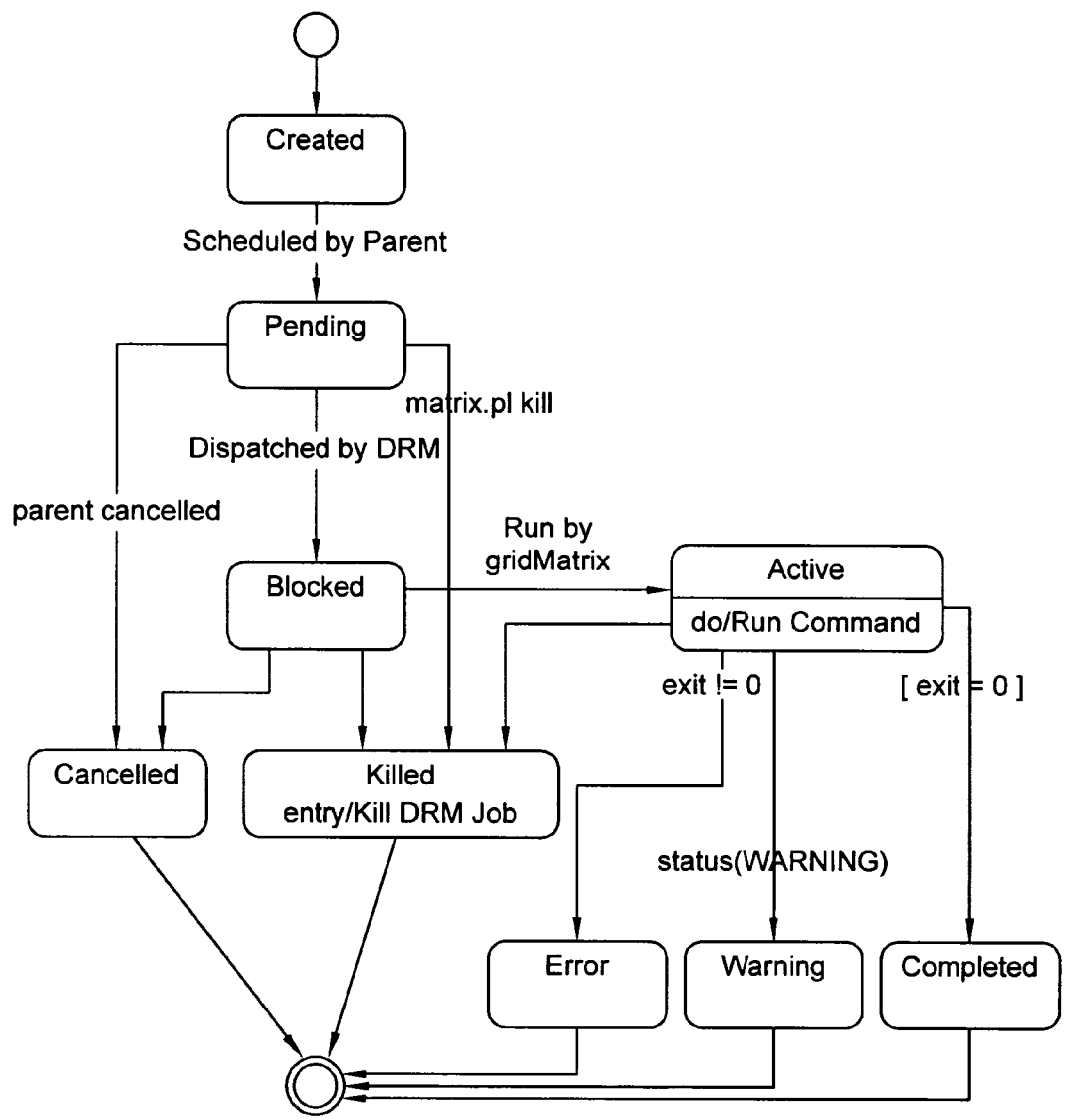
FIG. 4E illustrates states of a task.

Referring to FIG. 4E, a task has certain states. According to one embodiment, a task has the same states as work. A task begins in the created state. A task is moved from the created state to a pending state when a parent job schedules the task. The task is scheduled when the parent job is moved to the active state. Tasks in the pending state can be moved to the blocked state. A task is moved from the pending state to a blocked state when the task is submitted to the DRM 430. The task stays in the blocked state until the DRM 430 executes it. All tasks must move through the blocked state before actually performing work. The longer a task is in the blocked state, the longer it sits in the DRM 430 queues waiting to be distributed to a machine. The job will continue to stay in the blocked state until all of its dependencies have been satisfied. Tasks may be suspended until manual intervention to resume is performed. A task is moved from the blocked state to an active state when the task is actually executed on a host machine for the task.

A task is moved from the active state to a completed state when the corresponding command has finished executing. After the job is set to the completed state, it notifies its parent that it has finished. This is a type of state propagation that begins a chain of notification when a task's parent is notified. The parent will only change its state to completed when all of its children have the state completed.

A task can be moved from the active state to a warning state, after which the job notifies its parent that it has finished. This is a type of state propagation that begins a chain of notification when it's parent is notified. The parent will only change its state to warning when all of its children are in a finished state (completed, warning or error) and at least one in the warning state. A task is moved from the active state to an error state when the command executed returns a exit value that is not 0 (which is the standard failure exit code for commands). After the job is set to the error state, it notifies its parent that it has finished. This is a type of state propagation that begins a chain of notification when it's parent is notified. The parent will only change its state to error when one of its children have the state error. A task transitions from a previous (not finished) state to the killed state when a gridMatrix kill command is issued. The user can specify any of the jobs or tasks by ID when killing a job. When a task is moved to this state, it will kill all processes and sub processes of the executing command. The state propagation moves both up and down the tree. After the job completes "killing" its subwork, it notifies its parent that it has finished. The parent will only change its state to killed when all of its children are in a finished or a killed state. A killed state also results if a timeout is set for a job or task and the job doesn't finish in the set time. A task transitions from a pending or blocked state to a cancelled state when a parent is canceled. Since tasks do not have dependencies, they can not be cancelled directly. Rather, only their parent jobs can be cancelled, and as a result the task will never run, and it is marked cancelled.

Tasks in a job are run sequentially. A task does not start until all previous subworks are finished. If the previous subwork is a task, then it does not start until that task is completed. If the previous subwork is a job, then the task will not start until all previous jobs are complete.

FIG. 4F illustrates one example of timing of tasks. As can be seen in FIG. 4F, tasks are not in a pending state until its parent job is in an activate state (1.1.1.1.). Further, parent jobs are not completed until all of the tasks are completed (1.3). Additionally, tasks that are neat to each other in the job definition are run sequentially (1.5.1.3). When a task's command finishes, the exist status is set in the gridMatrix. For example, an error can be indicated by =!0, completed is indicated by =0.

A job is a type of work and represents a collection of jobs and/or tasks to be executed in the grid 100. Tasks are grouped together to form jobs. A job can be executed, controlled and reported by the management layer 420. Jobs can have zero or more sub-works, which can be a task or another job (i.e., sub-job). JRL provides the capability of defining jobs and passing parameters to the job definitions, which are instantiated as job objects. The parameters are used to create commands that represent tasks that execute on a server. The results of a task are maintained in a log file 450.

The gridMatrix 400 runs all jobs in parallel. All jobs can be run at the same time. Placing dependencies between the jobs lets the gridMatrix 400 know what order the individual tasks should be executed. The gridMatrix 400 gives the user the ability to define dependencies between jobs within the job definition. A job with a dependency, or multiple dependencies, does not execute until all dependencies are satisfied. More specifically, jobs encompass prerequisites and dependencies and can depend on any other job or subjob in a job definition. Job dependencies define the order that jobs are executed. A job may have 0 or more subworks, which can be a task or a job. This layering of jobs allows users to define complex multi-leveled job definitions in the gridMatrix 400. Thus, a user can break down complex processes into small and manageable steps that can be analyzed and controlled.

Figure 4G:
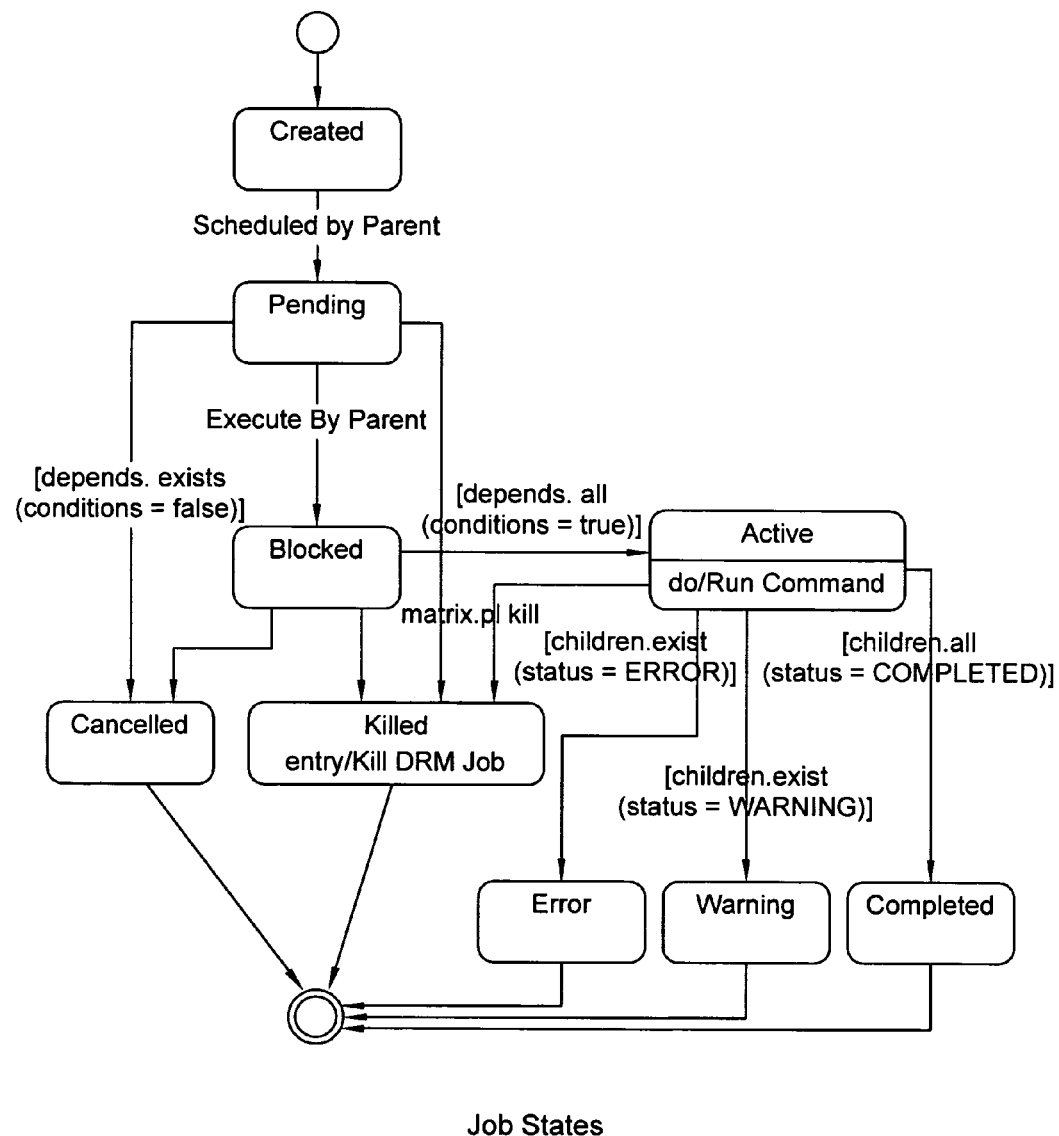
FIG. 4G illustrates states of a job.

Referring to FIG. 4G, a job has states that are similar to the states of work. The names of the states are the same, but there are additional ramifications to the states of a job. All jobs begin in the created state. A job is moved from the created state to a pending state when the parent job schedules the job. If the job is the top level job, it is scheduled by the gridMatrix when the job is submitted to be run. A job is moved from the pending state to a blocked state when the parent job executes the job. All jobs must move through the blocked state before actually performing work. The job will continue to stay in the blocked state until all of its dependencies have been satisfied. Tasks may be suspended until manual intervention to resume is performed.

A job is moved from the blocked state to an active state when all the dependencies of the job have been satisfied. Each time a dependent job finishes, a message is sent to the job that it depends on, and the gridMatrix 400 checks the dependency criteria for all of the dependent jobs. If all criteria are satisfied, the job can move into the active state. When a job is in the active state, all subworks are first scheduled (subworks are moved to the pending state) and then the gridMatrix 400 will execute all subwork of the job (all subworks are moved to the active state). This propagation of state continues to the leaf nodes of the job aggregation tree. The timing diagram for the job shows the propagation of state.

A job is moved from a pending or blocked state to a canceled state when the job's dependencies cannot be satisfied, e.g., when conditional dependencies are used. For example, if a job has a dependency on another job finishing in the error state and the job finishes in the completed state, then the job will be moved into the cancelled state and will never execute. After a job is moved into the cancelled state, it notifies its parent it has finished. This is another type of state propagation, but unlike the active state propagation that moves down the tree, this propagation goes from child to parent.

A job is moved from the active state to a completed state when all of its subworks have been moved to the completed state. When a subwork finishes, it notifies its parent that it has finished. The parent job checks the status of all of its subwork and sets the state to completed if all subwork is completed. After the job is sent to the completed state, it notifies its parent that it has finished. This is another type of state propagation, but unlike the active state propagation that moves down the tree, this propagation moves from child to parent. The parent will only change its state to completed when all of its children have the state completed.

A job is moved from an active state to a warning state when all of the job's subworks have been moved to a finished state (completed, warning or error) with some subworks state being warning. When a subwork finishes, it notifies its parent. The parent job checks the status of all of its subwork and sets the state to warning if at least one of the subworks is in the warning state. After the job is set to the warning state, it notifies its parent that it has finished. This is another type of state propagation, but unlike the active state propagation that moves down the tree, this propagation moves from child to parent. The parent will only change its state to warning when all of its children are in a finished state (completed, warning or error) and at least one in the warning state.

A job transitions from an active state to an error state when all of its subworks have been moved to a finished state (completed, warning or error) with at least one in the error state. When a subwork finishes, it notifies its parent that it has finished. The parent job checks the status of all of its subwork and sets the state to error if at least one of the subworks is in the error state. After the job is sent to the error state, it notifies its parent that it has finished. This is another type of state propagation, but unlike the active state propagation that moves, down the tree, this propagation goes from child to parent. The parent will only change its state to error when all of its children are in a finished state (completed, warning or error) and at least one in the error state. A job transitions from a previous (not finished) state to the killed state when a kill command is used. The user can specify any of the jobs or tasks by ID when killing a job. When a job is moved to this state, it will set the state of all of its subwork that is not finished to the killed state. This propagation is similar to the active state propagation as it travels down the job aggregation tree "killing" all of the children down to the leaf nodes of the tree. In addition to moving down the tree, the state propagation moves up the tree in the same manner as the other finished states. After the job has "killed" its subwork, it notifies its parent that it has finished. The parent will only change its state to killed when all of its children are in a finished state or killed state.

FIG. 4H illustrates one example of timing of jobs. Subjobs are not submitted until a parent job is in an active state. (1.2; children 1.21-4). Further, all jobs pass through a blocked state before becoming active. Jobs with dependencies are put into a blocked state until dependent jobs are completed. For example, as shown in FIG. 4H, 1.3 starts after 1.2 finishes. Further, jobs are not completed until all children jobs are completed. This is true for all finished states (completed, warning and error).

Tasks are executed in an execution environment. The task's execution environment consists of environment variables and a directory hierarchy or working directory. The gridMatrix 400 allows users to define the directory hierarchy and working directory through a concept named workspace. All tasks are run with respect to a workspace. Workspace creation is controlled and monitored by the management layer 420 or the gridMatrix 400. After execution of the tasks within a given workspace, the resources associated with the given workspace are automatically deconfigured, or purged so that resources are freed up for use by other jobs. Further details concerning work, jobs, subjobs, tasks and workspaces are provided in the provisional and non-provisional applications that were previously incorporated herein by reference.

Figure 4I:
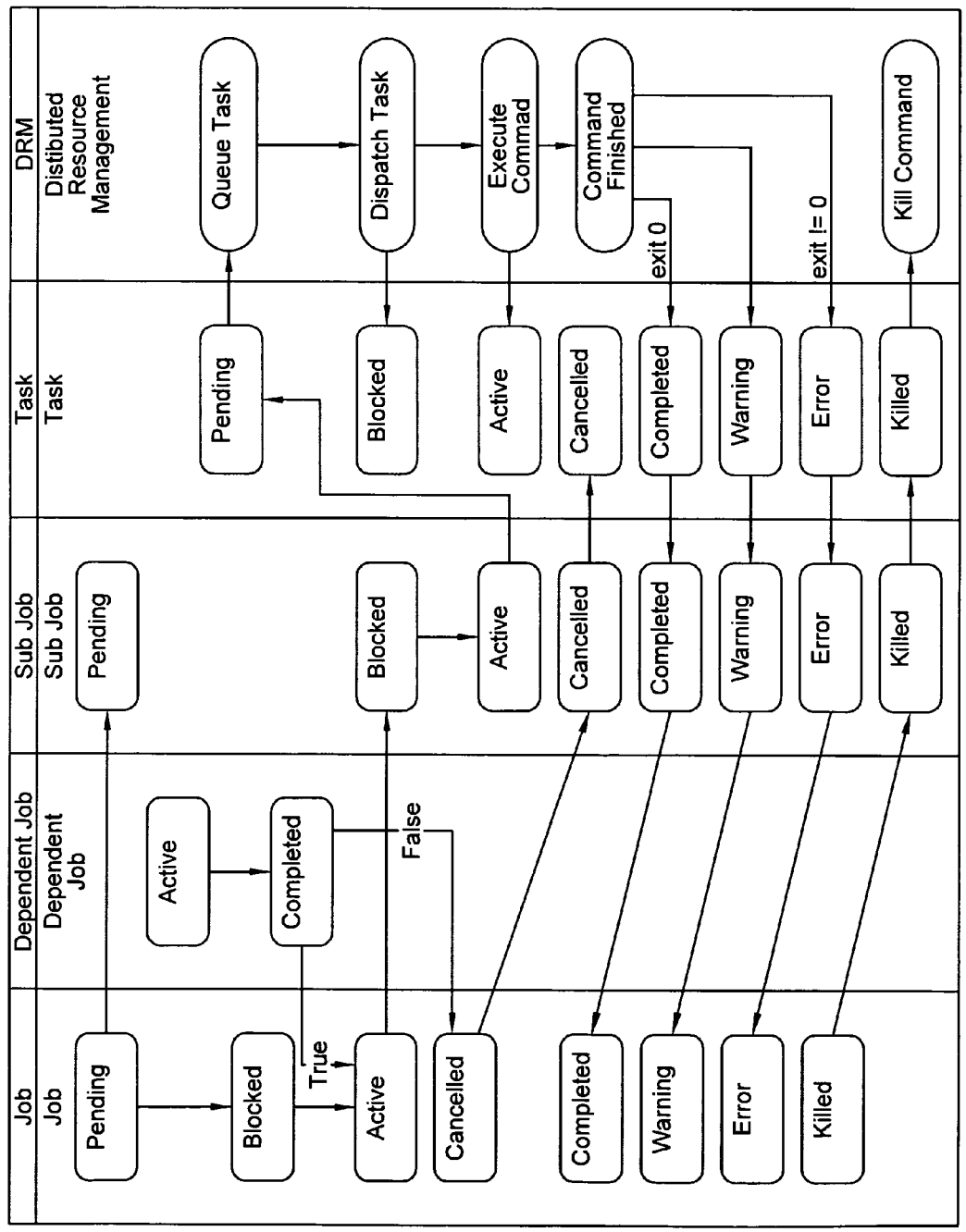
FIG. 4I illustrates how jobs, tasks and a distributed management system of a distributed computing environment interact with each other.

FIG. 4I illustrates how jobs, tasks and the DRM 430 interact with each other. The illustrated example shows how a job with a dependent subjob interacts. More specifically, the job is placed in a pending state by its parent. The job transitions to a Blocked state automatically. The dependent job moves to a completed state from the active state. If the condition on the dependency evaluates to true, the job is moved to an active state. If the condition of the dependency evaluates to false, the job is moved to a cancelled state, which is propagated down to a subjob and the task of the job.

The subjob is moved to a blocked state. The subjob has no dependencies and is moved to an active state automatically. The task is moved to a pending state and is sent to the DRM 430 to be executed. When the task begins execution, the task is marked active. When the task is completed, it can assume one of three states. First, if the exit code is zero, then task assumes a completed state. If the exit code is non-zero, then the state will be an error state. A warning state can be set by a command through a module. The status is passed to the subjob and then up to the job. A job can be killed, and this is propagated down to an individual task. The DRM 430 is notified to kill the command.

Embodiments provide methods for retrying a section or element (generally element) of work or workflow or a workflow tree (generally workflow) or an entire workflow in a distributed computing environment or grid after a failure of a workflow element. One embodiment is directed to determining where a workflow has failed and determining where in the workflow to place a retry. For example, if it is determined that a child element of a workflow failed, then that element can be retried for a predetermined number of times according to a retry value. Other elements of the workflow can be configured in a similar manner. If one or multiple child elements do not successfully execute, then the parent of the failed element(s) can be retried. Thus, when a fault in a workflow is detected, elements of the workflow can be retried, and the retry process can be propagated upwardly through the hierarchy so that higher workflow levels are retried until the workflow is successfully executed (if at all).

Embodiments can also be utilized in systems that utilize workflow dependencies. For example, embodiments involving retrying workflows or sections thereof can be used in grid systems, such as the grid and job relationships described and illustrated in FIGS. 1-4I, which provide the capability establishing different dependences between or among elements, such as jobs having various numbers of subjobs and tasks.

Figure 5:
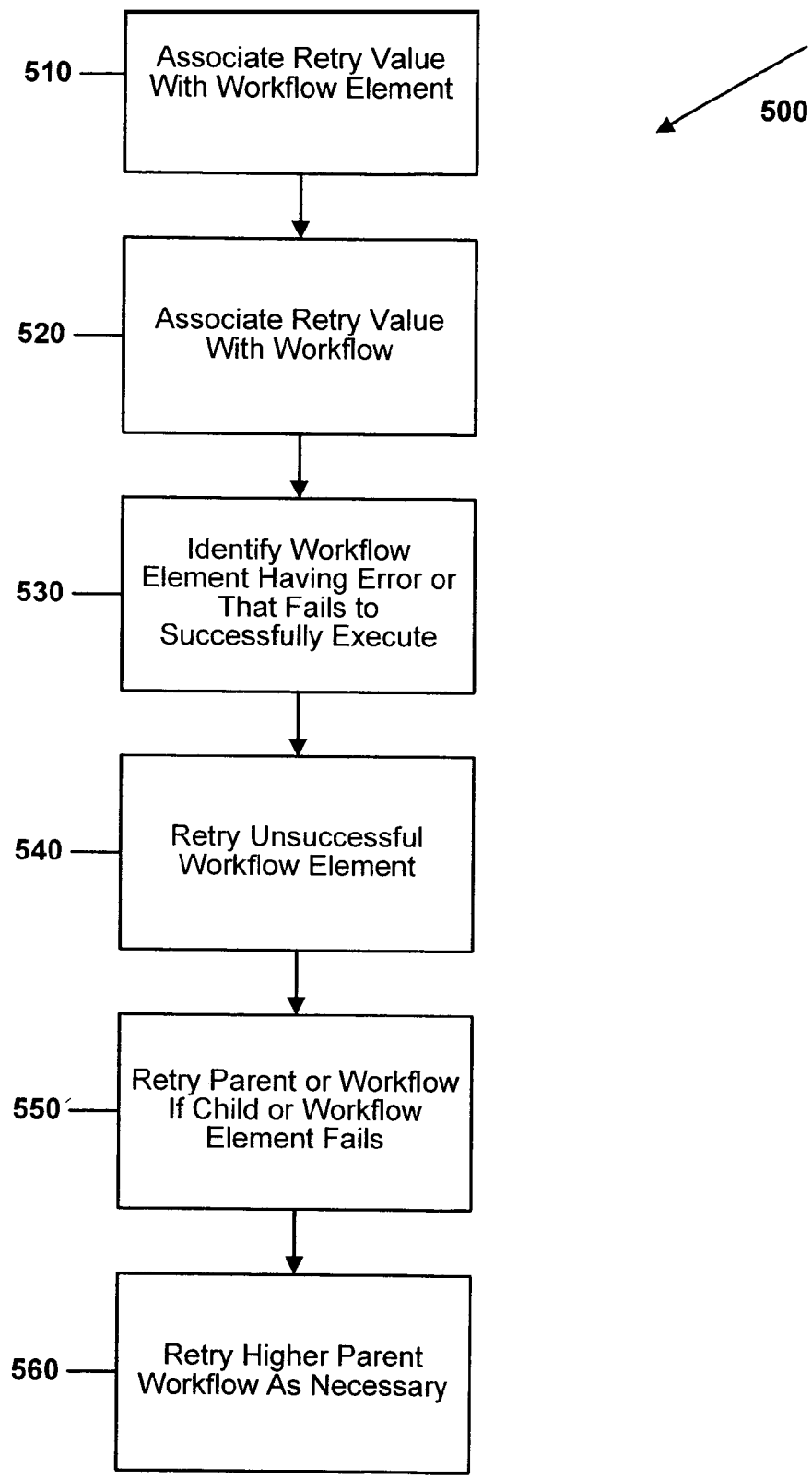
FIG. 5 is a flow diagram illustrating how elements of a workflow can be retried according to one embodiment.

FIG. 5 illustrates a method 500 of retrying elements of a workflow according to one embodiment. In step 510, a retry value is associated with one or more elements or "child" elements of a workflow. In step 520, a retry value is associated with the workflow or "parent" (which includes one or more child workflow elements). Persons skilled in the art will appreciate that steps 510 and 520 are not required to be performed in a particular order.

A retry value, whether for a workflow or parent element, or a child element, identifies, indicates or represents (generally indicates) the number of retries associated with that particular workflow or workflow element. Thus, in the event that a workflow element does not successfully execute, that element can be retried a maximum number of times according to the retry value.

Persons skilled in the art will appreciate that a retry "value" can be numeric, alpha, alpha-numeric and a symbol that directly or indirectly indicates the number of times a particular workflow element can be retried. For example, a retry value of an integer "4" may indicate that the particular workflow element can be retried a maximum of four times. Further, "4" or another value may correspond to or represent another value, which represents the retry value, using, for example, a look up table. Similarly, various symbols and non-numeric indicators can correspond to retrying a workflow element a maximum of four times.

According to one embodiment, the retry value is a predetermined value. In alternative embodiments, the retry value is not predetermined and can be retrieved from various sources or memory and generated on the fly. For purposes of explanation and illustration, not limitation, this specification refers to a retry "value" as a numeric value or integer that represents the maximum number of retries for a particular workflow element.

In step 530, one or more workflow elements that do not successfully execute are identified. Such workflow elements include, for example, elements that are in an error state. According to one embodiment, in the grid described in FIGS. 1-4I, an error state is a state in which a workflow element executes, but terminates with at least one error. Various conditions can define an error causing a workflow to not successfully execute. For purposes of explanation, not limitation, this specification refers to identifying workflow elements that do not successfully execute as a result of having an error when the workflow element terminates.

In step 540, a workflow element that does not successfully execute is retried. The failed element may be retried and successfully executed after a number of retries that is less than or equal to the retry value. The workflow can then continue executing unless it fails for another reason, e.g., another failed child element. For example, if a retry value is 10, the workflow element may fail at first, but then successfully execute after one, two, three, and other numbers of retries, up to 10 retries according to the retry value.

Otherwise, if after the designated number of retries, the identified element has not successfully executed, then in step 550, the workflow or parent is retried. In other words, the execution can proceed up a hierarchy from the one or more failed child elements to a parent element or parent workflow. In this case, the parent of the child element is retried as many times as is specified by the retry value associated with the parent (step 520).

Figure 6:
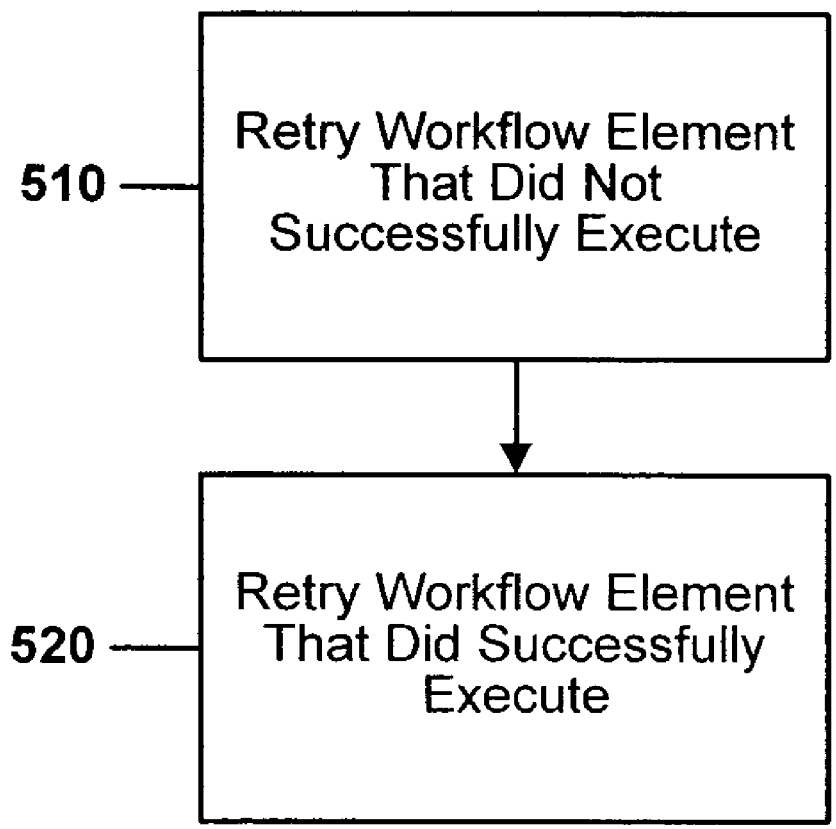
FIG. 6 is a flow diagram illustrating retrying of a parent workflow.

Referring to FIG. 6, according to one embodiment, when a parent or workflow is retried (step 550), then all of the sub-works or children are also retried. There may be cases where all or some of the child elements fail to successfully execute. For example, in step 610, every child element that did not successfully execute is retried according to a retry value for each respective element and, in addition, in step 620, each child element that did successfully execute is retried according to a retry value for each respective element.

Referring again to FIG. 5, in step 560, if the parent work continues to fail to successfully complete after the designated number of retries following step 550, then, if applicable, the retry attempts propagate further upwardly through the hierarchy or workflow tree to a grandparent, or greater grandparent, etc. for further retries at a higher level. This means that if any portion of the parent work fails, including a portion that was not originally in error, another retry occurs. Similar to the method shown in FIG. 6, the child work (and other child works associated with the grandparent) are retried, and each grandchild work of each child work is retried. This process can continue upwardly through the workflow hierarchy until successful completion occurs, or until the top level or a specified threshold is reached.

Figure 7:
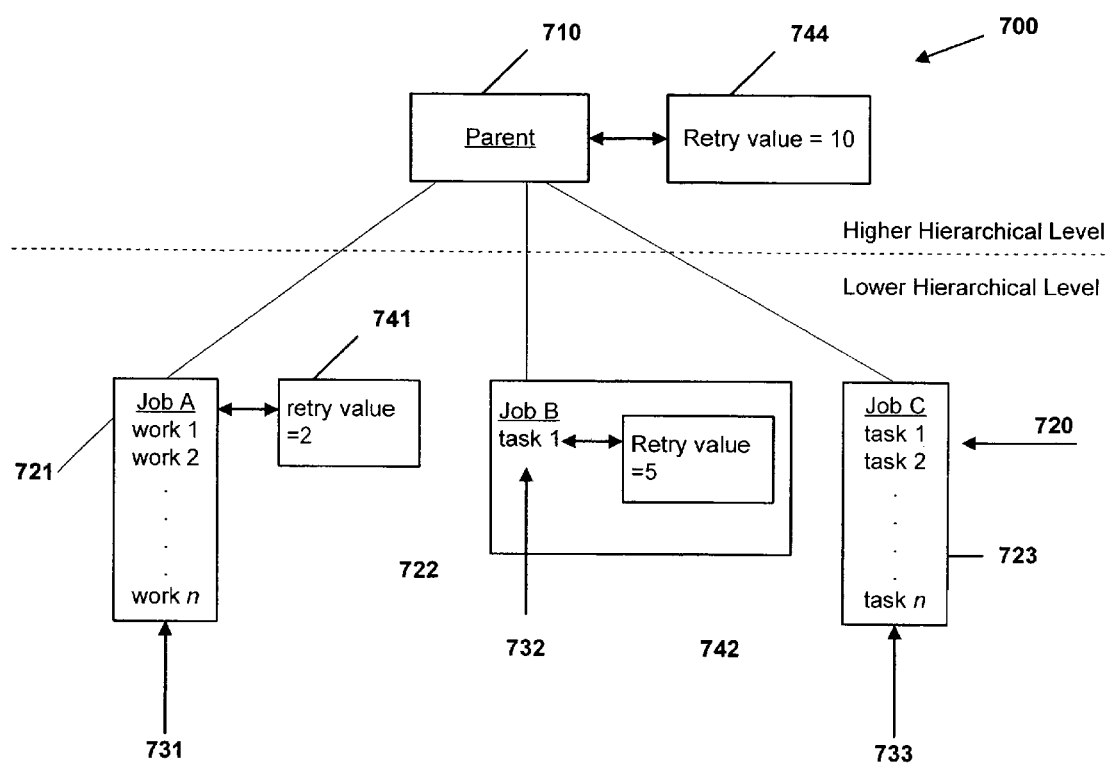
FIG. 7 illustrates retry values associated with a parent workflow and different children workflow elements and how a parent workflow can be retried when a child work element fails according to one embodiment.
Figure 8:
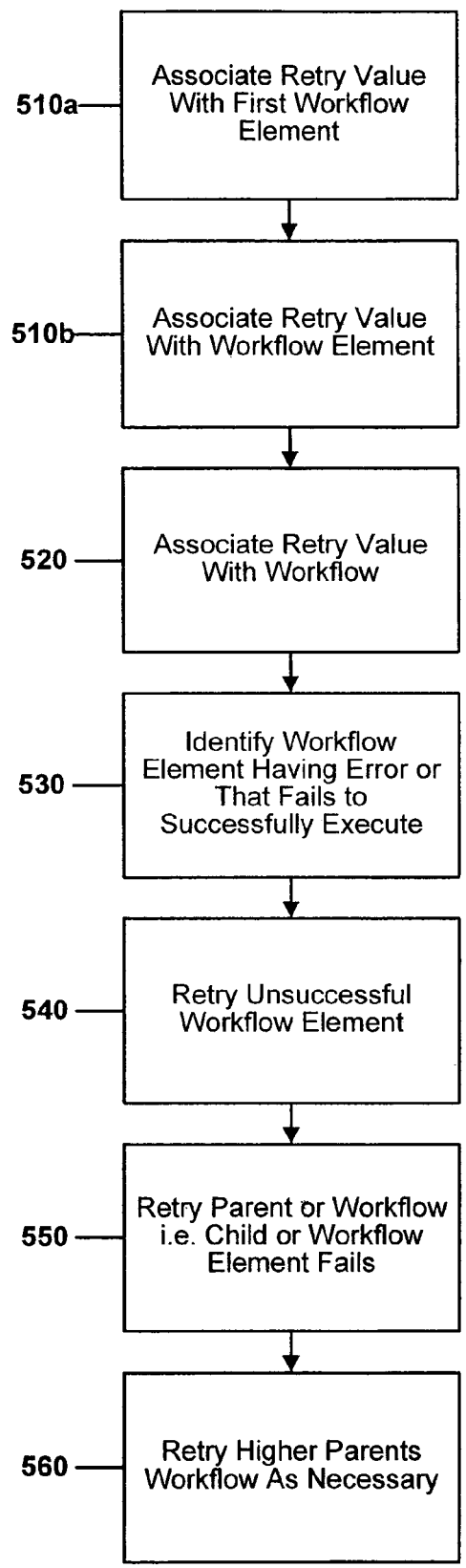
FIG. 8 is flow chart illustrating retrying elements of a workflow having multiple elements and retry values associated with the elements according to another embodiment.

FIG. 7, illustrates in further detail how one embodiment can be implemented. In the illustrated example, a workflow 700 has a parent job 710, which has three child or sub-jobs 720-JobA 721, JobB 722 and JobC 723 (generally 720). The jobs 720 may have various numbers of tasks and/or other types of sub-work. As previously discussed, a child work can be a job or a task. In the example shown in FIG. 7, JobA 721 includes works 1-n 731 (such as subjobs), JobB 722 includes a task 723, and Job C 723 includes multiple tasks 1-n 733. The different components of the workflow 700 can have the same or different retry values. For example, in the illustrated embodiment, JobA 721 is defined to have a retry value 741 of 2. Accordingly, if any child work inside JobA 721 fails, e.g., exits with an error condition, then all of works 1-n 731 of JobA 721 will be rerun two times according to the retry value 741. Thus, for example, if JobA 721 includes 100 different work elements 731, then Job A 721 (and each of the 100 work elements 731) can be run twice according to the retry value 741.

In the illustrated example, Job B includes one task 732, and that task 732 is associated with a retry value 742 of 5. Thus, if that task 732 fails, then only that task 732 will be retried up to five times according to its retry value 742. Job C 723 includes multiple tasks. In the illustrated embodiment, Job C 723 is not associated with a retry value and thus, is not retried if one of its tasks 733 fails to successfully execute.

In the illustrated example, the parent job 710 has a retry value 744 of 10. Accordingly, if any of Jobs A, B or C fails to successfully execute, then the parent job 710 is retried up to 10 times according to the retry value 744. This means that if Job A 721 does not successfully execute, e.g., because any one of its children work 1-n 731 finishes in an error state, then Job A 721 (and all of the associated work 1-n 731) is retried twice. Then, if Job A 721 still cannot successfully execute, the parent job 710 is retried up to 10 times. This results in each of Jobs A, B and C being retried. This is true even if one or both of Jobs B and C 722 and 723 completed successfully. Stated otherwise, if Job A 721 fails for any reason, it will actually be retried a maximum of 20 times. The 20 retries in this example is the result of the product of (the retry value 741 of Job A) and (the retry value 744 of the Parent), or 2*10=20. The same method applies to other jobs 720 below the parent 710. Thus, for example, if the task 732 of Job B 722 fails, then that task 732 will be rerun a maximum of 50 times. The 50 retries in this example is the result of the product of the retry value 742 of Job B of 5 and the retry value 744 of the Parent of 10.

Accordingly, so long as at least one child 720 ends up in an error state, then the parent 720 is an error state. Consequently, the parent 720 will retry each of Jobs A, B and C up to ten times until everything successfully completes. Otherwise, if the parent does not successfully execute, the retry method can proceed further up the hierarchy (step 560) to a higher level, such as a grandparent, great-grandparent, etc. until execution is successful.

This approach can be expanded to various hierarchies having various numbers and relationships of jobs, subjobs and tasks. For example, FIG. 7 illustrates associating retry values with 10 child elements, and retrying parents, grandparents, etc. up the hierarchy as necessary. Persons skilled in the art will appreciate that various numbers of retries and hierarchical structures can be used. Accordingly, embodiments can be used in different hierarchical configurations, and FIGS. 5-8 are provided for purposes of illustration and explanation, not limitation.

Further, as shown in FIG. 4I, for example, embodiments can be applied to perform retry with element dependencies. For example, a dependency can be defined such that a Job C will not run unless a Job A finishes in a certain state, e.g., an error state. If there is a retry value of 2 on Job A, and Job A is run twice and ends in an error state, then Job C will actually run. If the parent of Jobs A and C has a retry value of 10, then as soon as Job C runs and completes (i.e., A, B, C have all completed), then the parent job may check its children work to see if any have errors. The parent may find that Job A has not successfully executed and has errored out. Consequently, the parent job runs all of its children again. During the second retry by the parent job, assume that Job A completes successfully. In this case, Job C is cancelled the second time due to the dependency. In this example, the first time Job C was executed, but the second time, Job C is actually in a cancelled state. Accordingly, there may be restrictions on a retry, e.g., based upon canceling jobs with this type of job dependency. The above example is provided for purposes of explanation, not limitation, as various dependencies and dependency chains and relationships can be incorporated into various hierarchical workflows with different retry values for the parent and child work elements.

Following is a description of one manner of implementing retries within workflows executed on the gridMatrix 400. Persons skilled in the art will appreciate that retries can be implemented in other manners, and the following description is illustrative of how a retry can be implemented in a distributed computing network or grid 100.

According to one embodiment, a retry command is $retry. Thus, $retry=x means retry a workflow element or job "x" times on a failure of the element or job. The following exemplary JR language code illustrates how a retry can be implemented:

EXAMPLE 1

```
Build( )
   &BuildPlatform("solaris")
   &BuildPlatform("hpux")
   &BuildPlatform("windows")
BuildPlatform($pPlatform):
   $retry=5
   !make
```

In this example, BuildPlatform will be tried five times until it passes successfully. This shows that the task "make" could be called five times. Jobs are retried at the job level, not the task level. Thus, the whole job will be retried again according to where the $retry is placed.

EXAMPLE 2

```
Build( )
    $retry=3
    &BuildPlatform("solaris")
    &BuildPlatform("hpux")
    &BuildPlatform("windows")
BuildPlatform($pPlatform):
    !make $pPlatform
```

In this example, the workflow is completed three times if any one of the BuildPlatforms fails.

If any of the BuildPlatforms fail, all of the BuildPlatforms will be tried again. Even if a BuildPlatform was successful, but one of its siblings failed, then the complete "Build" job will be run again. There is a potential for all three platforms in this example to be run three times if for example the "hpux" platform fails each time.

The $retry variable can be added in the example to try the BuildPlatform as well as the Build job over and over again.

EXAMPLE 3

```
Build( )
    $retry=3
    &BuildPlatform("solaris")
    &BuildPlatform("hpux")
    &BuildPlatform("windows")
BuildPlatform($pPlatform):
    $retry=5
    !make $pPlatform
```

In this example the "BuildPlatform" job will be run five times or until it passes successfully. Let's say that the "windows" BuildPlatform does not pass after five times of trying, then the job "Build" will actually fail and all "BuildPlatform" jobs will be tried again. That means that the "BuildPlatform (windows)" could be called 15 times before the top job "Build" actually finishes.

EXAMPLE 4

```
FeedAnimals( ):
    $retry=2
    &Feed("Pigs")
    &Feed("Cows")
    &GatherHay( )
    &GetSlop( )
    &BuyMoreHay( )
    &BorrowSlop( )
Feed("Cows"): GatherHay( )[COMPLETED]
    $platform="Big Red Barn"
    !feedCows
Feed("Pigs"): GetSlop( )[COMPLETED]
    $platform="Pig Pen"
    !slopThePigs
BuyHay( ): GatherHay( )[ERROR]
$ platform="Big Hay Barn Inc."
    !buyHay
BorrowSlop( ): GetSlop( )[ERROR]
    $platform="Neighbor"
    !borrowSlop
```

In the above example 4, the JR language file shows how retries can work with conditional dependencies in the Dependency section under examples "Feeding Cows and Pigs." In this final example, there are two attempts to feed the animals, but two paths could be followed depending on the ERROR condition of the GatherHay and GetSlop.

Figure 9:
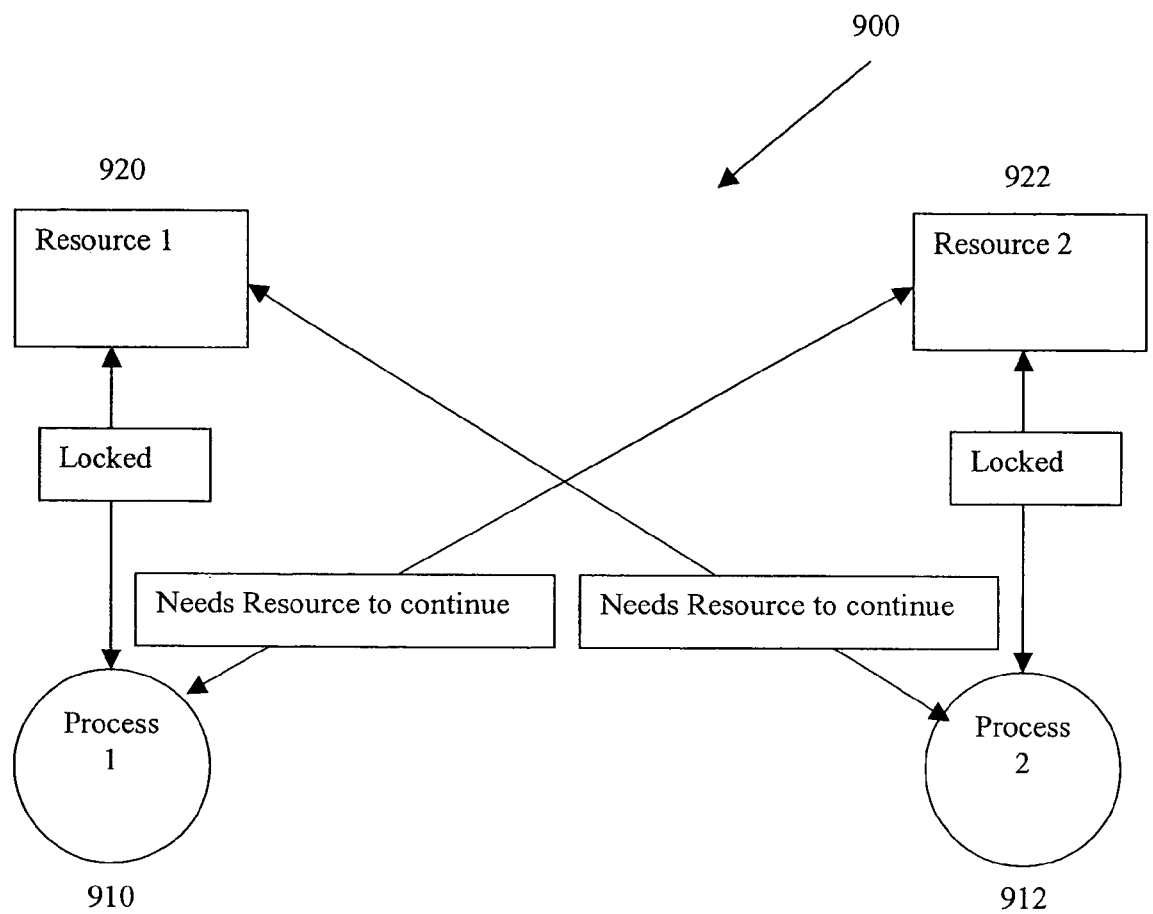
FIG. 9 illustrates an example of deadlock situation.
Figure 10:
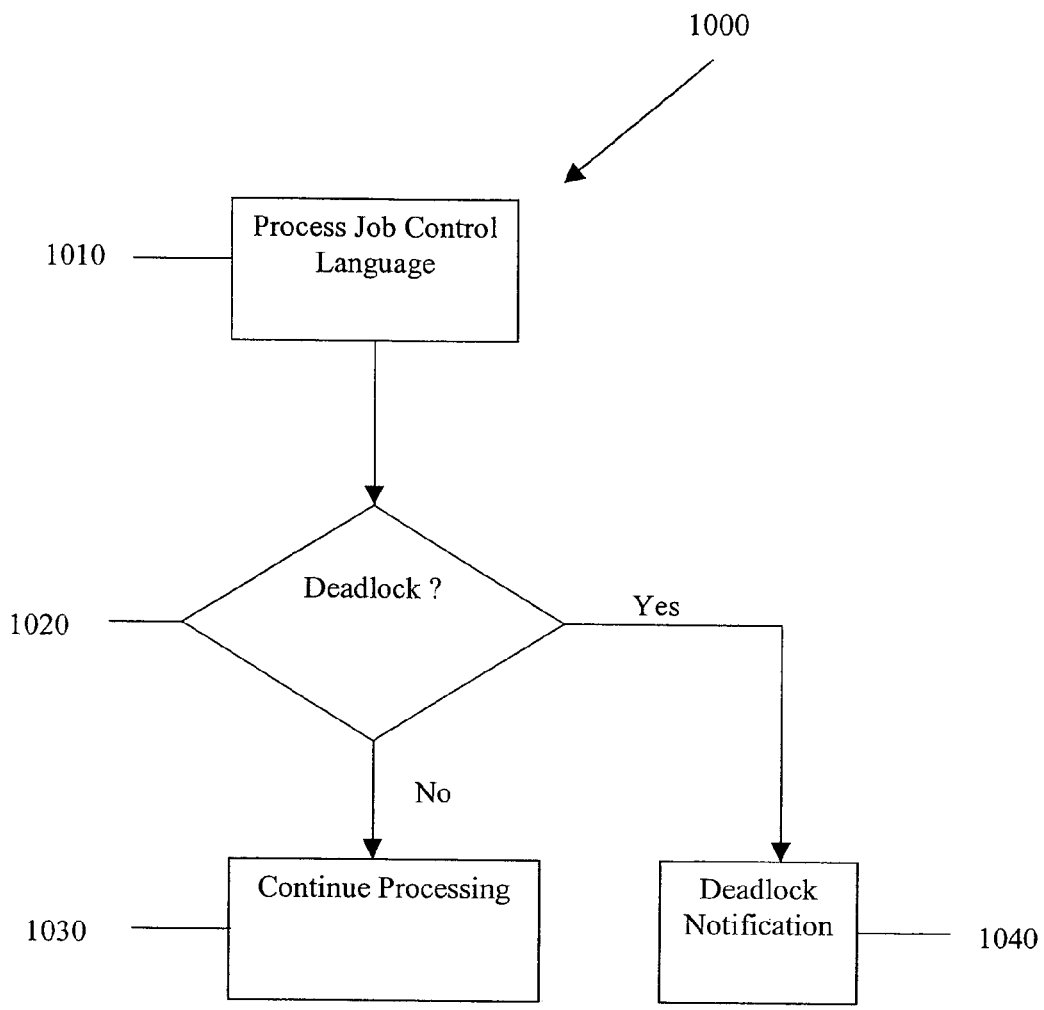
FIG. 10 is a flow chart of a method of determining a deadlock situation according to one embodiment.

Referring to FIG. 10, another embodiment is directed to detecting intermediate dependencies that can cause deadlock, an example of which is shown in FIG. 9. In step 1010, JR language requests are processed, and in step 1020, a determination is made whether a deadlock situation exists. If not, then processing continues in step 1030. In step 1040, if a deadlock situation is identified, then a notification is generated and sent to the user to inform the user where and why the deadlock situation has occurred. The deadlock can be automatically addressed, e.g., by stopping a job or processing entity, or by releasing a resource that is needed for processing.

First Pass—Direct Dependency Detection

Figure 11:
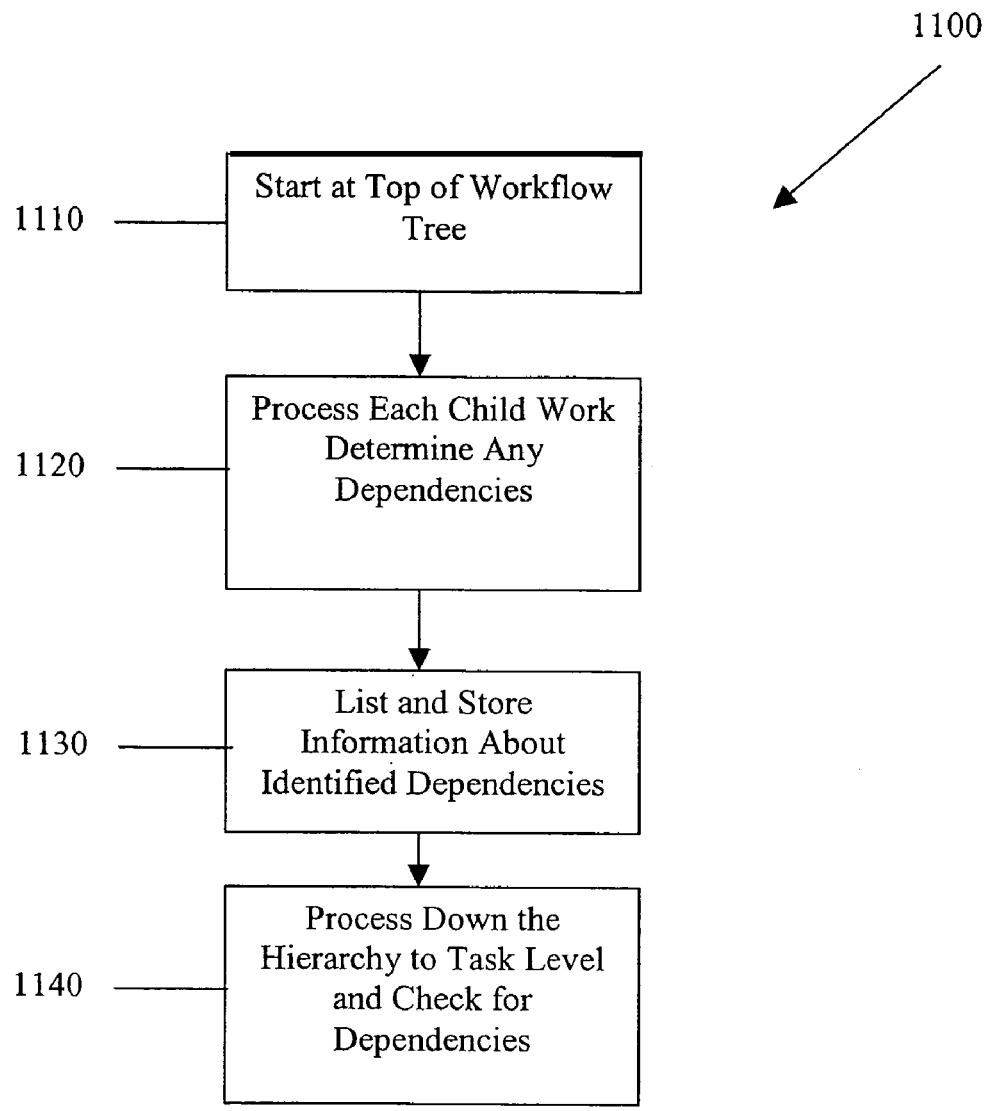
FIG. 11 is a flow chart of a method of determining direct dependencies according to one embodiment.

FIG. 11 depicts a more detailed process of a first pass 1100 for addressing deadlocks in a distributed computing grid. In step 1110, a process starts at the top of the workflow tree and request a top job for work that is performed by its children work or child elements. The process proceeds through each child element in step 1120, and as the process propagates down through each child element, checks are made for direct dependencies, such as who a child work element is directly dependent upon and on what conditions the child work element depends.

In step 1130, if it is determined that a child work element includes one or more direct dependencies, then direct dependency information is recorded, such as in a memory or other suitable temporary or permanent storage. The recorded information can include whether it has a direct dependency and what is the dependency. Another item of information that can be stored includes error conditions.

In step 1140, the process iteratively goes down through the whole workflow tree to determine the direct dependencies it has. Therefore, the process finds out which direct dependencies exists in the workflow, and stores information as they are identified.

As the process works through the workflow tree, determinations are made regarding whether there are any sub-works and children work sets. If so, then the same processing occurs down through the tree, e.g., in a recursive manner. In one embodiment, this process goes through the tree down to the task level.

Second Pass—Indirect Dependency Detection

Figure 12:
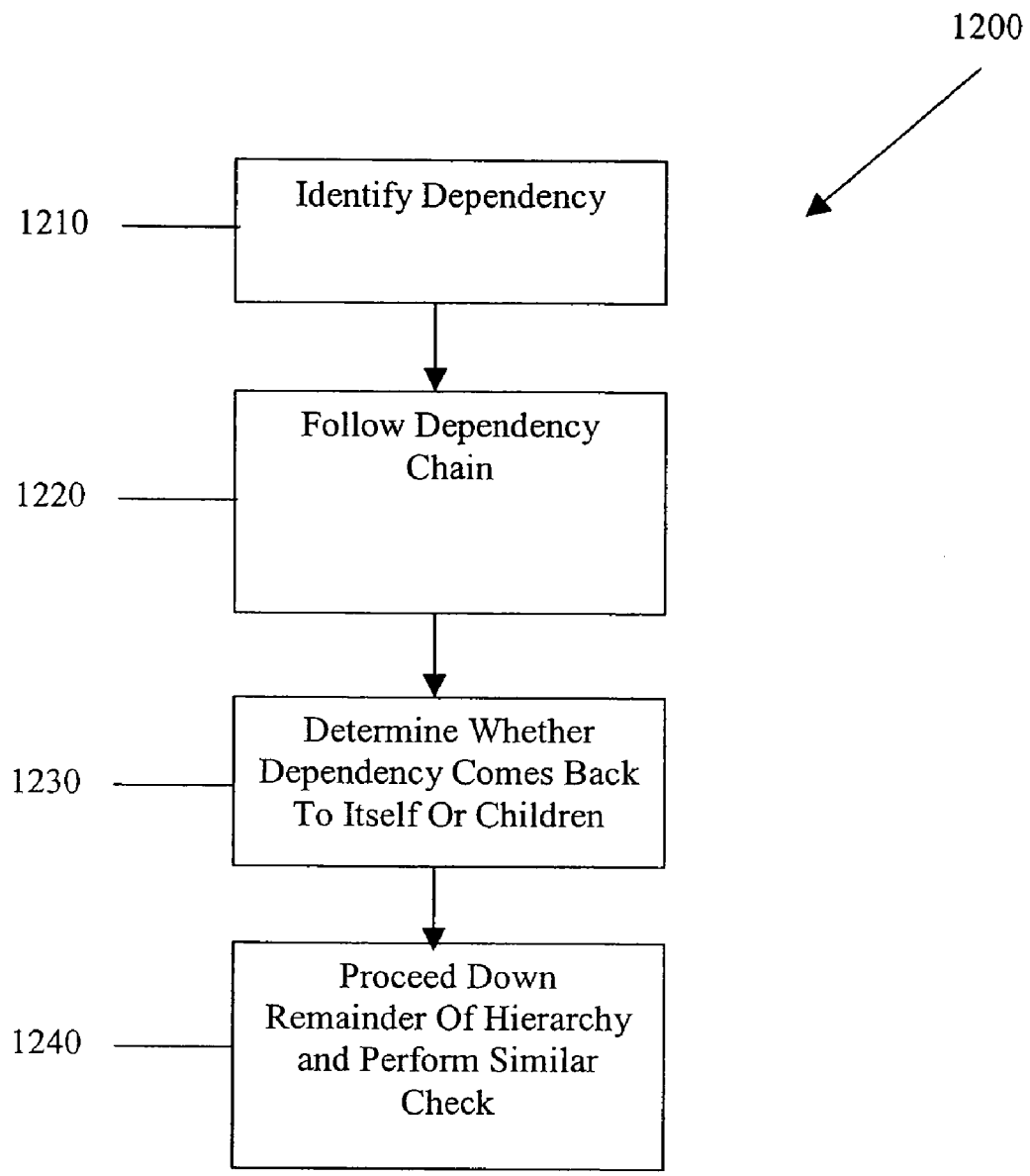
FIG. 12 is a flow chart of a method of determining indirect dependencies according to one embodiment.

Referring to FIG. 12, in a second pass 1200, the process additionally checks for indirect dependencies. In step 1210, a dependency is identified, and in step 1220, a chain of dependencies is followed. In one embodiment, this check occurs and goes through each node.

In step 1230, a check is made whether the dependency chain comes back or loops back to itself, or to any one of its lower level descendants, which could be a child, a grandchild, all the way down to the lowest levels of the tree. This is performed down through the entire hierarchy in step 1240. If the process identifies any such dependency, the it has detected a deadlock situation.

In one embodiment, this type of analysis is performed for both the workflow tree as well as every node in the dependency loop. This is to ensure that all deadlocks are identified against the current node that is being looked at or its descendants. Once the process does this on a node, then it goes down to the children and does the same thing for all the dependencies identified.

Third Pass for Deadlock Detection—Indirect Dependency Detection

Figure 13:
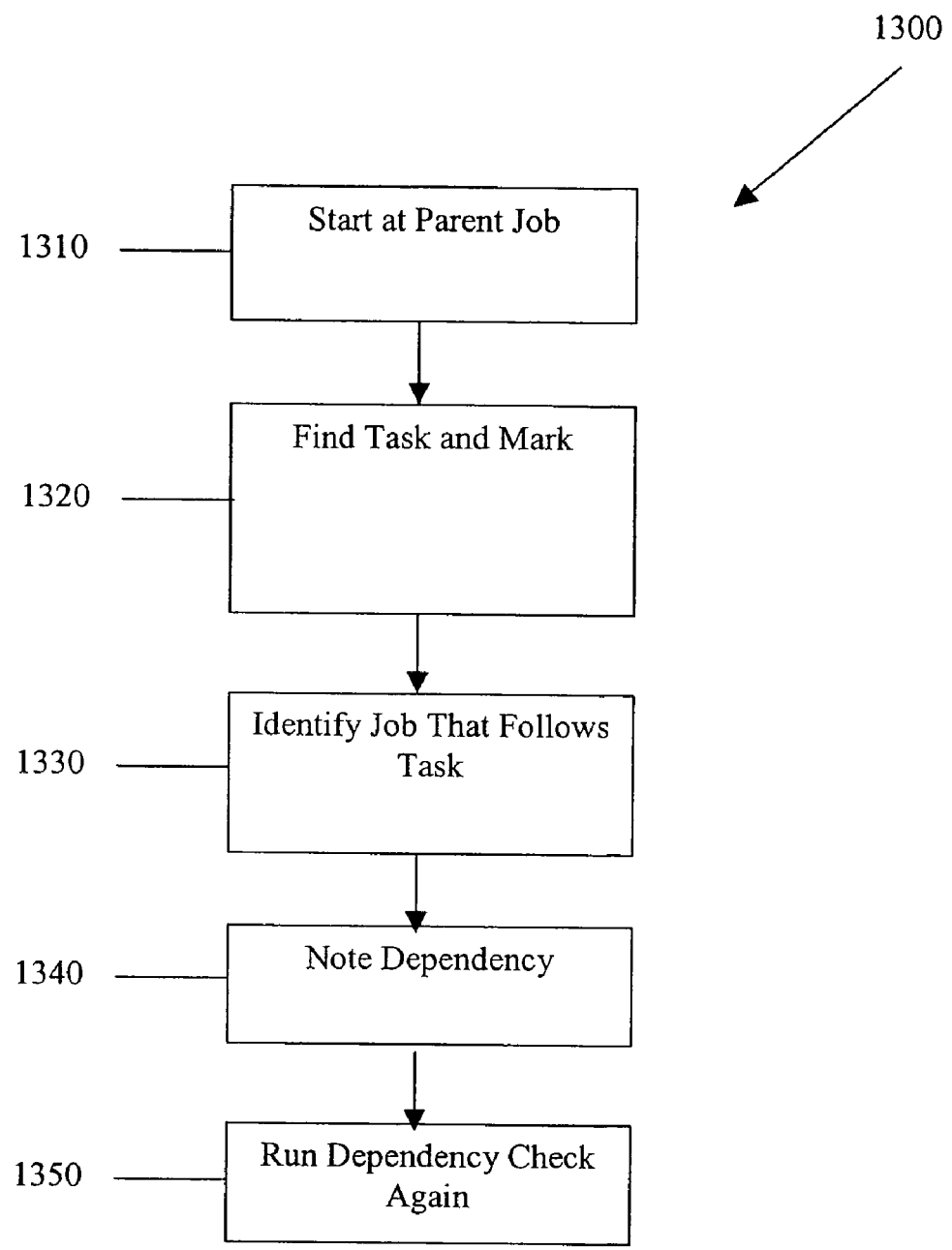
FIG. 13 is a flow chart of a method of identifying a task conflict according to one embodiment.

Referring to FIG. 13, in a third pass 1300, the process looks for task conflicts. In step 1310, the process starts at the parent, e.g., the top job, and goes down the hierarchy to find and mark or note a task in step 1320. The process continues until a job is identified among the child work elements in step 1330. This job follows a task. Once this job is identified, then a dependency is noted for this situation in step 1340. The job depends on this task finishing. In step 1350, the passes 1100 and 1200 described above can be performed.

Tasks have an implicit dependency on every single work above it in lexical space in the JR file itself. Thus, for example, if JobA, has five sub-works, four of which are sub jobs and the other a task, then the task has a dependency on all four sub-works finishing first before the task is executed. The task is, therefore, dependent upon completion of those jobs or works above it. If these jobs or works are not completed, then that task will not be executed. Accordingly, the third check 1300 is directed to determining whether there are any jobs that follow a task since a job cannot run if a task is just above it, until that task completes. The third pass 1300 checks for the implicit dependency on a job on a related task, and that task on all the previous jobs, and find out if there's any deadlock situation in there as well. This will determine if there are any loops.

Reflag Pass for Deadlock Detection

Figure 14:
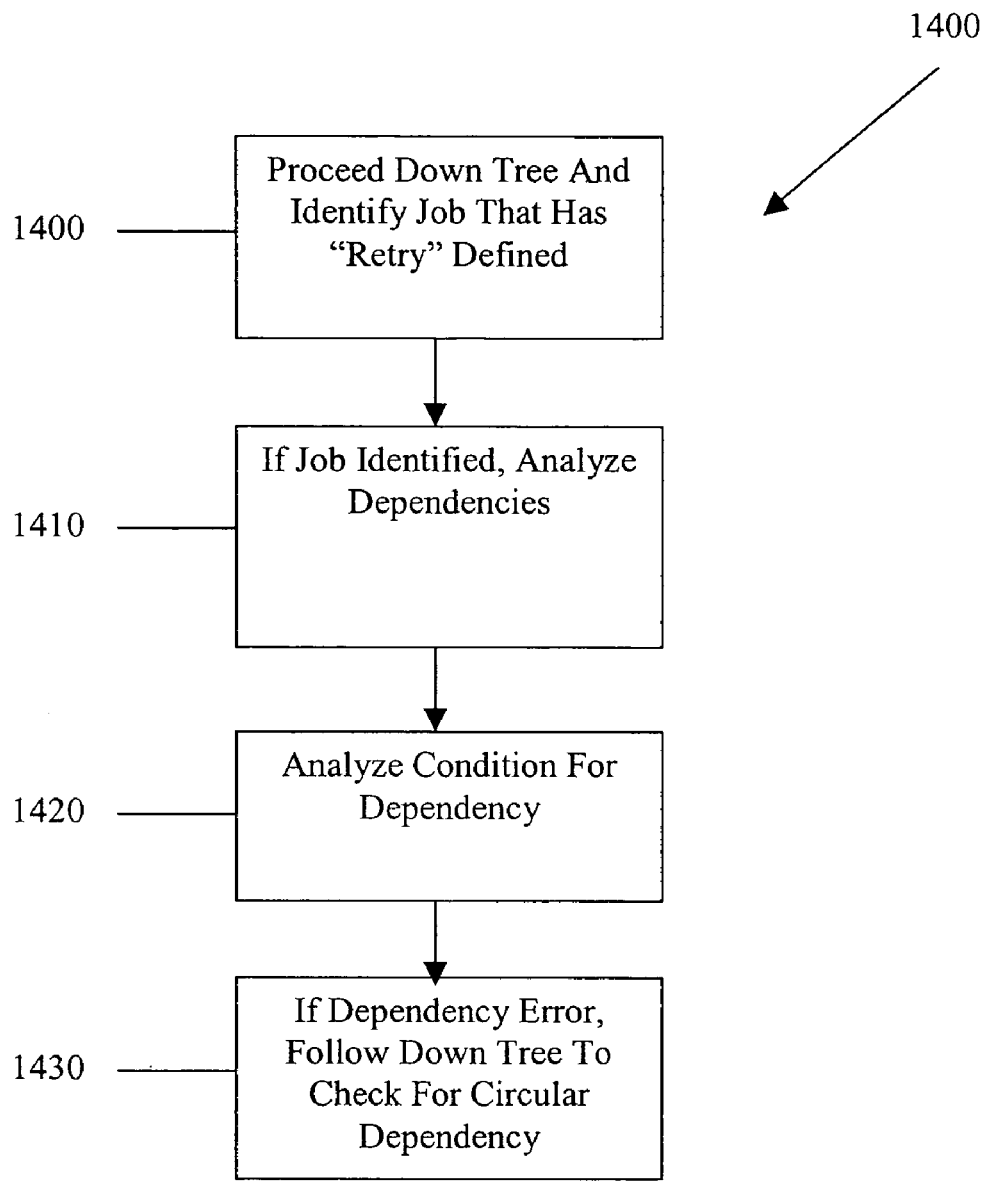
FIG. 14 is a flow chart illustrating a method of checking for retry definitions following dependency checks according to one embodiment.

Referring to FIG. 14, another pass 1400 relates to performing a re-flag after all of the dependencies have already been identified. In step 1400, the process goes down the tree again and determines whether any job has a retry defined. A retry is described above with reference to FIGS. 5-8). If a job is determined to have a retry defined, then in step 1410, the job's dependencies are analyzed, and in step 1420, conditions on the dependency are identified. In step 1430, if there is an error dependency, then the process follows that tree down, for that error dependency, and ensures that no loop or circular dependency exists.

Response to Deadlock Situation

Figure 15:
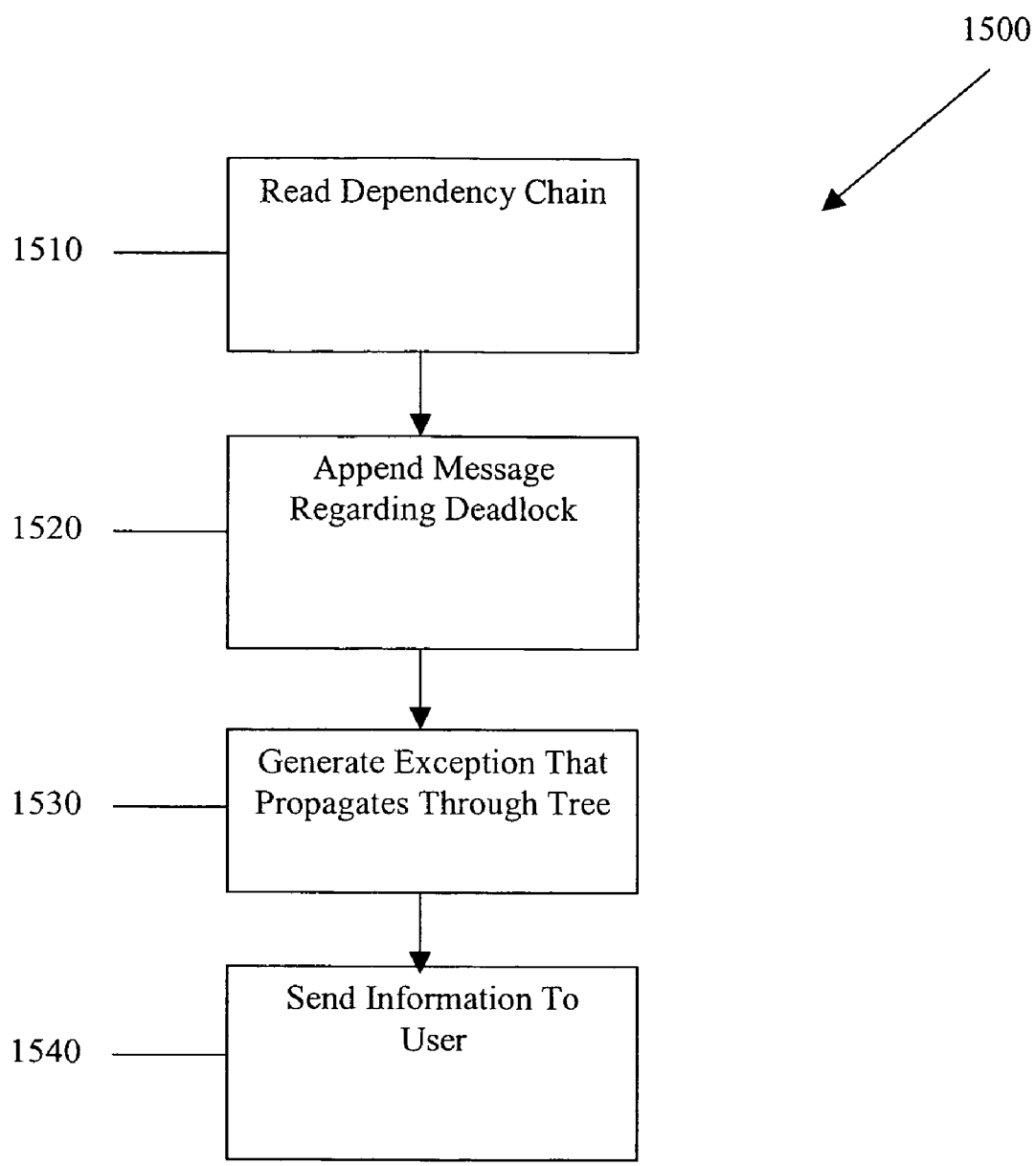
FIG. 15 is a flow chart illustrating a method of notifying a user of a deadlock situation.

FIG. 15 is a flowchart depicting a process 1500 for handling identified deadlocks according to one embodiment. Generally, the process 1500 throws an exception that propagates if a deadlock is identified. More particularly, in step 1510, the dependency chain is read, and in step 1520, a determination is made as to the location of a circular dependency in the workflow that forms the deadlock situation. If there is a deadlock situation, then in step 1530, the process appends a message showing where that deadlock situation is, which shows the whole dependency tree all the way through. Then, in step 1540, the process throws an exception that then propagates up the tree all the way through the job hierarchy, adding to where it was when it came through, and then sending that information to the user so that the user knows exactly where the deadlock situation exists.

Embodiments have been described with reference to specific illustrates and descriptions thereof. It will, however, be evident that various modifications and changes may be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. The specification and drawings are, accordingly, to be regarded in an illustrative rather than restrictive sense.

What is claimed:

1. A computer implemented method for detecting indeterminate dependencies in a distributed computing grid, comprising:
   using the distributed computing grid which comprises at least one processor to perform a process, the process comprising:
      determining whether a deadlock situation exists within a workflow of the distributed computing grid by using a processing module, wherein
         the processing module manages execution of the workflow in the distributed computing grid and maintains statistics on one or more runs of the execution of the workflow in the distributed computing grid, and
         the processing module determines whether a dependency loop or a dependency chain exists within the workflow by at least determining whether a job in the workflow follows a task in the workflow, wherein
            the dependency loop begins and terminates at a child element within the workflow, and
            the job comprises one or more jobs or one or more tasks;
      retrying execution of a smaller subset of the job at a first level in the execution of the job before propagating a retry to a parent level above the first level in the execution of the job based at least in part upon a result of retrying the execution of the smaller subset of the job; and
      notifying a user of the deadlock situation if the deadlock exists.

2. The method of claim 1, wherein determining whether a deadlock situation exists comprises:
   beginning at the top of the workflow and propagating down the workflow to determine whether a child element of the workflow can cause a deadlock situation.

3. The method of claim 2, wherein the child element comprises a job.

4. The method of claim 2, wherein the child element comprises a task, wherein the task is executable on a processor of the distributed computing environment.

5. The method of claim 2, wherein propagating down the workflow comprises:
   identifying a parent job in the workflow;
   identifying a first child element of the parent job; and
   determining whether the first child element can cause a deadlock situation.

6. The method of claim 1, wherein determining whether a deadlock situation exists comprises:
   identifying a direct dependency involving a child element of the workflow that can cause a deadlock situation.

7. The method of claim 6, wherein execution of the child element depends directly on execution of another child element.

8. The method of claim 6, wherein execution of the another child element depends directly on execution of the child element.

9. The method of claim 1, wherein determining whether a deadlock situation exists comprises identifying an indirect dependency involving a child element of the workflow that can cause a deadlock situation.

10. The method of claim 9, identifying the indirect dependency comprising:
    determining whether a dependency loop exists, wherein the loop begins and terminates at a child element of the workflow.

11. The method of claim 9, identifying the indirect dependency comprising:
    determining whether a chain of dependencies begins at a first child work element of the workflow and ends at a lower level child element of the workflow.

12. The method of claim 11, wherein the lower level child element is a grandchild or a great-grandchild element of the workflow.

13. The method of claim 1, wherein determining whether a deadlock situation exists comprises identifying a task conflict, wherein a task is executable on a processor of the distributed computing environment.

14. The method of claim 13, wherein identifying a task conflict comprises identifying a job that follows a task in the workflow, wherein a task is executable on a processor of the distributed computing environment.

15. The method of claim 13, wherein identifying a task conflict comprises:
   beginning at the top of the workflow, propagating down the workflow;
   identifying a task in the workflow; and
   identifying a job that follows the task in the workflow; and
   assigning a dependency to the job, wherein execution of the job depends on execution of the task.

16. The method of claim 1, wherein determining whether a deadlock situation exists comprises:
   identifying direct and indirect dependencies involving a child element of the workflow that can cause a deadlock situation; and
   determining whether a child element of the workflow is associated with a retry definition.

17. The method of claim 1, wherein a deadlock situation is caused by a child element of the workflow, further comprising:
   generating a message indicating the deadlock situation; and
   propagating the generated message up the workflow hierarchy from the child element to a top hierarchy of the workflow.

18. The method of claim 17, notifying the user comprising notifying the user of the generated message propagated up the workflow.

19. The method of claim 1, notifying the user comprising notifying the user of a location in the workflow having a deadlock situation.

20. The method of claim 1 being performed for each child element of the workflow.

21. The method of claim 1, wherein the act of determining whether the deadlock situation exists comprises:
   determining whether execution of a first child element depends directly on execution of a second child element;
   determining whether a dependency loop exists, wherein the dependency loop begins and terminates at the same child element of the workflow;
   determining whether a chain of dependencies begins at a first child work element of the workflow and ends at a lower level child element of the workflow; and
   if a deadlock situation exists, notifying the user of a location in the workflow where the deadlock situation exists.

22. The method of claim 21, determining whether a deadlock situation exists further comprising:
   identifying a task conflict, wherein a task conflict comprises a job that follows a task in the workflow, wherein a task is executable by a processor in the distributed computing grid.

23. The method of claim 21, further comprising determining whether a child element of the workflow is associated with a retry definition.

24. A computer implemented method for detecting indeterminate dependencies in a distributed computing grid, comprising:
   using the distributed computing grid which comprises one or more processors to perform a process, the process comprising:
   determining whether a deadlock situation exists within a workflow of the distributed computing grid by determining whether a job in the workflow follows a task in the workflow, in which the job comprises one or more jobs or one or more tasks;
   determining direct dependencies involving a child element of the workflow by using a processing module, wherein the processing module manages execution of the workflow in the distributed computing grid and maintains statistics on one or more runs of execution of the workflow in the distributed computing grid; and
   retrying execution of a smaller subset of the job at a first level in the execution of the job before propagating a retry to a parent level above the first level in the execution of the job based at least in part upon a result of retrying the execution of the smaller subset of the job; and
   notifying a user of the deadlock situation if the deadlock exists.

25. The method of claim 24, wherein the child element is a job.

26. The method of claim 24, wherein the child element is a task, wherein the task is executable on a processor of the distributed computing environment.

27. The method of claim 24, wherein determining direct dependencies comprises determining whether execution of a first child element depends directly on execution of a second child element.

28. The method of claim 24, further comprising determining indirect dependencies, wherein the act of determining the indirect dependencies comprises determining whether a dependency loop exists, in which the loop begins and terminates at the same child element of the workflow.

29. The method of claim 24, further comprising determining any indirect dependencies, in which the act of determining the any indirect dependencies comprises determining whether a chain of dependencies begins at a first child work element of the workflow and ends at a lower level child element of the workflow.

30. The method of claim 29, wherein the lower level child element is a grandchild or a great-grandchild element of the workflow.

31. The method of claim 24, determining whether a deadlock situation exists further comprising identifying a task conflict, wherein a task is executable on a processor of the distributed computing environment.

32. The method of claim 31, wherein identifying a task conflict comprises identifying a job that follows a task in the workflow.

33. The method of claim 32, wherein identifying a task conflict comprises:
   beginning at the top of the workflow, propagating down the workflow;
   identifying a task in the workflow; and
   identifying a job that follows the task in the workflow; and
   assigning a dependency to the job, wherein execution of the job depends on execution of the task.

34. The method of claim 24, after direct and indirect dependencies are determined, determining whether a deadlock situation exists further comprising determining whether a child element of the workflow is associated with a retry definition.

35. The method of claim 24, wherein a deadlock situation is caused by a child element of the workflow, further comprising:
   generating a message indicating the deadlock situation; and
   propagating the generated message up the workflow hierarchy from the child element to the top of the workflow; and
   notifying the user of the generated message propagated up the workflow.

36. The method of claim 24, notifying the user comprising notifying the user of a location in the workflow having a deadlock situation.

37. The method of claim 24 being performed for each child element of the workflow.

38. The method of claim 24 being performed for each child element of the workflow.

39. The computer implemented method of claim 24, wherein the act of determining whether the deadlock situation exists comprises:

determining whether execution of a first child element depends directly on execution of a second child element, determining whether a dependency loop exists, wherein the loop begins and terminates at the same child element of the workflow, determining whether a chain of dependencies begins at a first child work element of the workflow and ends at a lower level child element of the workflow, and determining whether a child element of the workflow is associated with a retry definition, determining whether a task conflict exists for task child elements, wherein a task conflict comprises a job that follows a task in the workflow, and a task is executable by a processor in the distributed computing grid; and if a deadlock situation exists, notifying the user of a location in the workflow wherein the deadlock situation exists.

40. A system for detecting indeterminate dependencies in a distributed computing grid, comprising:
the distributed computing grid which comprises at least one processor and is to:
determine whether a deadlock situation exists within a workflow of the distributed computing grid by using a processing module, wherein
the processing module manages execution of the workflow in the distributed computing grid and maintains statistics on one or more runs of the execution of the workflow in the distributed computing grid, and
the processing module determines whether a dependency loop or a dependency chain exists within the workflow by at least determining whether a job in the workflow follows a task in the workflow, wherein
the job comprises one or more jobs or one or more tasks, and
the dependency loop begins and terminates at a child element within the workflow;
retry execution of a smaller subset of the job at a first level in the execution of the job before propagating a retry to a parent level above the first level in the execution of the job based at least in part upon a result of retrying the execution of the smaller subset of the job; and
notify a user of the deadlock situation if the deadlock exists.

41. The system of claim 40, the distributed computing grid programmed for performing the act of determining whether the deadlock situation exists is further programmed for performing:
determining whether execution of a first child element depends directly on execution of a second child element;
determining whether a dependency loop exists, wherein the dependency loop begins and terminates at the same child element of the workflow;
determining whether a chain of dependencies begins at a first child work element of the workflow and ends at a lower level child element of the workflow; and
if a deadlock situation exists, notifying the user of a location in the workflow where the deadlock situation exists.

42. The system of claim 40, the distributed computing grid programmed for performing the act of determining whether the deadlock situation exists is further programmed for performing:
beginning at the top of the workflow and propagating down the workflow to determine whether a child element of the workflow can cause a deadlock situation.

43. The system of claim 42, the distributed computing grid programmed for performing the act of beginning at the top of the workflow and propagating down the work flow is further programmed for performing:
identifying a parent job in the workflow;
identifying a first child element of the parent job; and
determining whether the first child element can cause a deadlock situation.

44. The system of claim 40, the distributed computing grid programmed for performing the act of determining whether the deadlock situation exists is further programmed for performing:
identifying direct and indirect dependencies involving a child element of the workflow that can cause a deadlock situation; and
determining whether a child element of the workflow is associated with a retry definition.

45. A computer program product comprising a non-transitory computer readable storage medium having a sequence of instructions stored thereupon which, when executed by a distributed computing grid, causes at least one processor of the distributed computing grid to perform a process for detecting indeterminate dependencies in the distributed computing grid, the process comprising:
using the distributed computing grid which comprises at least one processor and is to perform a process, the process comprising:
determining whether a deadlock situation exists within a workflow of the distributed computing grid by using a processing module, wherein
the processing module manages execution of the workflow in the distributed computing grid and maintains statistics on one or more runs of the execution of the workflow in the distributed computing grid, and
the processing module determines whether a dependency loop or a dependency chain exists within the workflow by at least determining whether a job in the workflow follows a task in the workflow, wherein
the job comprises one or more jobs or one or more tasks, and
the dependency begins and terminates at a child element within the workflow;
retrying execution of a smaller subset of the job at a first level in the execution of the job before propagating a retry to a parent level above the first level in the execution of the job based at least in part upon a result of retrying the execution of the smaller subset of the job; and
notifying a user of the deadlock situation if the deadlock exists.

46. The computer program product of claim 45, the process for determining whether the deadlock situation exists further comprising:
determining whether execution of a first child element depends directly on execution of a second child element;
determining whether a dependency loop exists, wherein the dependency loop begins and terminates at the same child element of the workflow;
determining whether a chain of dependencies begins at a first child work element of the workflow and ends at a lower level child element of the workflow; and
if a deadlock situation exists, notifying the user of a location in the workflow where the deadlock situation exists.

47. The computer program product of claim 45, the process for determining whether the deadlock situation exists further comprising:
beginning at the top of the workflow and propagating down the workflow to determine whether a child element of the workflow can cause a deadlock situation.

48. The computer program product of claim 47, the process for beginning at the top of the workflow and propagating down the work flow further comprising:
identifying a parent job in the workflow;
identifying a first child element of the parent job; and
determining whether the first child element can cause a deadlock situation.

49. The computer program product of claim 45, the process for determining whether the deadlock situation exists further comprising:
- identifying direct and indirect dependencies involving a child element of the workflow that can cause a deadlock situation; and
- determining whether a child element of the workflow is associated with a retry definition.

50. A system for detecting indeterminate dependencies in a distributed computing grid, comprising:
- the distributed computing grid which comprises one or more processors and is to:
- determine whether a deadlock situation exists within a workflow of the distributed computing grid by:
  - determining whether a job in the workflow follows a task in the workflow, in which the job comprises one or more jobs or one or more tasks;
  - determining direct dependencies involving a child element of the workflow by using a processing module, wherein
    - the processing module manages execution of the workflow in the distributed computing grid and maintains statistics on one or more runs of execution of the workflow in the distributed computing grid; and
- retry execution of a smaller subset of the job at a first level in the execution of the job before propagating a retry to a parent level above the first level in the execution of the job based at least in part upon a result of retrying the execution of the smaller subset of the job; and
- notify a user of the deadlock situation if the deadlock exists.

51. The system for claim 50, wherein a deadlock situation is caused by a child element of the workflow, the computing grid is further programmed for performing:
- generating a message indicating the deadlock situation; and
- propagating the generated message up the workflow hierarchy from the child element to the top of the workflow; and
- notifying the user of the generated message propagated up the workflow.

52. The system for claim 50, wherein the computing grid programmed for performing the act of determining whether the deadlock situation exists is further programmed for performing:
- determining whether execution of a first child element depends directly on execution of a second child element,
- determining whether a dependency loop exists, wherein the loop begins and terminates at the same child element of the workflow,
- determining whether a chain of dependencies begins at a first child work element of the workflow and ends at a lower level child element of the workflow, and
- determining whether a child element of the workflow is associated with a retry definition, and
- determining whether a task conflict exists for task child elements, wherein a task conflict comprises a job that follows a task in the workflow, and a task is executable by a processor in the distributed computing grid.

53. A computer program product comprising a non-transitory computer readable storage medium having a sequence of instructions stored thereupon which, when executed by a distributed computing grid, causes the one or more processors of the distributed computing grid to perform a process for detecting indeterminate dependencies in the distributed computing grid, the process comprising:
- the distributed computing grid which comprises the one or more processors and is programmed for performing a process comprising:
- determining whether a deadlock situation exists within a workflow of the distributed computing grid by:
  - determining whether a job in the workflow follows a task in the workflow, in which the job comprises one or more jobs or one or more tasks;
  - determining direct dependencies involving a child element of the workflow by using a processing module, wherein
    - the processing module manages execution of the workflow in the distributed computing grid and maintains statistics on one or more runs of execution of the workflow in the distributed computing grid;
- retrying execution of a smaller subset of the job at a first level in the execution of the job before propagating a retry to a parent level above the first level in the execution of the job based at least in part upon a result of retrying the execution of the smaller subset of the job; and
- notifying a user of the deadlock situation if the deadlock exists.

54. The computer program product for claim 53, wherein a deadlock situation is caused by a child element of the workflow, the process further comprising:
- generating a message indicating the deadlock situation; and
- propagating the generated message up the workflow hierarchy from the child element to the top of the workflow; and
- notifying the user of the generated message propagated up the workflow.

55. The computer program product for claim 53, wherein the process for determining whether the deadlock situation exists further comprises:
- determining whether execution of a first child element depends directly on execution of a second child element,
- determining whether a dependency loop exists, wherein the loop begins and terminates at the same child element of the workflow,
- determining whether a chain of dependencies begins at a first child work element of the workflow and ends at a lower level child element of the workflow, and
- determining whether a child element of the workflow is associated with a retry definition, and
- determining whether a task conflict exists for task child elements, wherein a task conflict comprises a job that follows a task in the workflow, and a task is executable by a processor in the distributed computing grid.

* * * * *